United States Patent
Querze et al.

(10) Patent No.: US 10,929,099 B2
(45) Date of Patent: Feb. 23, 2021

(54) SPATIALIZED VIRTUAL PERSONAL ASSISTANT

(71) Applicant: Bose Corporation, Framingham, MA (US)

(72) Inventors: Elio Dante Querze, Arlington, MA (US); Todd Richard Reily, North Reading, MA (US); Conor William Sheehan, Natick, MA (US); Isaac Keir Julien, Cambridge, MA (US); Marina Sanjiv Shah, Natick, MA (US); Shuo Zhang, Cambridge, MA (US); Elizabeth Kaye Nielsen, Allston, MA (US)

(73) Assignee: BOSE CORPORATION, Framingham, MA (US)

( * ) Notice: Subject to any disclaimer, the term of this patent is extended or adjusted under 35 U.S.C. 154(b) by 229 days.

(21) Appl. No.: 16/179,205

(22) Filed: Nov. 2, 2018

(65) Prior Publication Data

US 2020/0142667 A1 May 7, 2020

(51) Int. Cl.
*G06F 3/00* (2006.01)
*G06F 3/16* (2006.01)
*G06F 3/01* (2006.01)
*G10L 15/08* (2006.01)
*H04R 3/00* (2006.01)

(52) U.S. Cl.
CPC ............ *G06F 3/167* (2013.01); *G06F 3/012* (2013.01); *G06F 3/013* (2013.01); *G06F 3/017* (2013.01); *G10L 15/08* (2013.01); *H04R 3/00* (2013.01); *G10L 2015/088* (2013.01)

(58) Field of Classification Search
CPC .................................. H04S 7/00; H04S 5/033
See application file for complete search history.

(56) References Cited

U.S. PATENT DOCUMENTS

| | | | |
|---|---|---|---|
| 9,020,825 B1 * | 4/2015 | Garber | G06F 3/0485 704/275 |
| 9,313,359 B1 | 4/2016 | Stojancic et al. | |
| 9,607,488 B2 * | 3/2017 | Kim | B60K 37/06 |
| 10,129,682 B2 | 11/2018 | Mentz | |
| 10,194,259 B1 | 1/2019 | Martin et al. | |
| 2013/0156201 A1 | 6/2013 | Nakai | |
| 2013/0177187 A1 | 7/2013 | Mentz | |
| 2013/0178967 A1 | 7/2013 | Mentz | |
| 2013/0194164 A1 | 8/2013 | Sugden et al. | |

(Continued)

FOREIGN PATENT DOCUMENTS

WO 2019173573 A1 9/2019

OTHER PUBLICATIONS

Invitation to Pay Additional Fees and, where Applicable, Protest Fee, for International Application No. PCT/US2019/059516, dated Jan. 27, 2020, 17 pages.

(Continued)

*Primary Examiner* — Shreyans A Patel
(74) *Attorney, Agent, or Firm* — Hoffman Warnick LLC

(57) ABSTRACT

Various implementations include wearable audio devices having a spatialized virtual personal assistant (VPA). In other implementations, a method of controlling a wearable audio device having a spatialized VPA is disclosed. Other implementations include a method of generating a spatialized VPA in a wearable audio device.

29 Claims, 11 Drawing Sheets

(56) References Cited

U.S. PATENT DOCUMENTS

| | | | |
|---|---|---|---|
| 2014/0133658 A1 | 5/2014 | Mentz et al. | |
| 2014/0270321 A1* | 9/2014 | Fullam | H04R 1/028 |
| | | | 381/387 |
| 2014/0350942 A1* | 11/2014 | Kady | G06F 3/013 |
| | | | 704/275 |
| 2014/0361988 A1* | 12/2014 | Katz | G06F 3/012 |
| | | | 345/156 |
| 2015/0208166 A1 | 7/2015 | Raghuvanshi et al. | |
| 2016/0071526 A1 | 3/2016 | Wingate et al. | |
| 2016/0091336 A1* | 3/2016 | Oakley | H04B 5/0031 |
| | | | 340/407.1 |
| 2016/0198282 A1 | 7/2016 | Kim et al. | |
| 2016/0286316 A1 | 9/2016 | Bleacher et al. | |
| 2017/0245124 A1 | 8/2017 | Child et al. | |
| 2018/0020313 A1* | 1/2018 | Morishita | H04R 5/033 |
| 2018/0095713 A1 | 4/2018 | Rubin et al. | |
| 2018/0094939 A1 | 5/2018 | Holmes | |
| 2018/0146198 A1 | 5/2018 | Atluru et al. | |
| 2018/0173388 A1 | 6/2018 | Holmes et al. | |
| 2018/0335903 A1* | 11/2018 | Coffman | G06F 3/0414 |
| 2019/0121522 A1* | 4/2019 | Davis | G06F 3/04817 |
| 2019/0227766 A1* | 7/2019 | Nahman | H04R 1/1091 |
| 2019/0320260 A1* | 10/2019 | Alders | G10L 21/0232 |
| 2019/0340568 A1* | 11/2019 | Kiemele | G10L 15/22 |
| 2019/0365333 A1* | 12/2019 | Keen | A61B 5/747 |

OTHER PUBLICATIONS

The Virtual 4D Menu, published by Bragi, available via YouTube on May 16, 2017 (screen shot included), available at: https://www.youtube.com/watch?v=VH1eTNWfqKY.

International Search Report and Written Opinion for International Application No. PCT/US2019/059516, dated Mar. 19, 2020, 19 pages.

\* cited by examiner

SPATIALIZED VIRTUAL PERSONAL ASSISTANT

TECHNICAL FIELD

This disclosure generally relates to audio devices. More particularly, the disclosure relates to audio devices, such as wearable audio devices, including a spatialized virtual personal assistant.

BACKGROUND

Portable electronic devices, including headphones and other wearable audio systems are becoming more commonplace. However, the user experience with these audio systems is limited by the inability of these systems to adapt to different environments and locations. Additionally, although many of these audio systems are wirelessly paired with an audio gateway such as a mobile phone or other communications equipment, many control commands are still performed using the audio gateway's interface. This can further hinder the user experience.

SUMMARY

All examples and features mentioned below can be combined in any technically possible way.

Various implementations include wearable audio devices having a spatialized virtual personal assistant (VPA). In other implementations, a method of controlling a wearable audio device having a spatialized VPA is disclosed. Other implementations include a method of generating a spatialized VPA in a wearable audio device.

In some particular aspects, a wearable audio device includes: a speaker having an acoustic transducer with a sound-radiating surface for providing an audio output; at least one microphone; and a control system coupled with the speaker and the at least one microphone, the control system configured to: receive a virtual personal assistant (VPA) command from a user; and output a VPA audio response to the VPA command in a spatially rendered audio location defined relative to a look direction of the user or relative to a physical location proximate the user, and according to at least one of a VPA setting, a location of the wearable audio device, the look direction of the user or a type of the VPA command.

In other particular aspects, a computer-implemented method of controlling a wearable audio device includes: receiving a virtual personal assistant (VPA) command from a user; receiving sensor data indicating a look direction of the user; and outputting a VPA audio response to the VPA command in a spatially rendered audio location defined relative to the look direction of the user or relative to a physical location proximate the user, and according to at least one of a VPA setting, a location of the wearable audio device, the look direction of the user or a type of the VPA command.

In additional particular aspects, a computer-implemented method of generating a spatialized virtual personal assistant (VPA) in a wearable audio device, the method including: providing an application programming interface (API) with inputs including: a set of spatially rendered audio locations for providing a VPA audio response at the wearable audio device; and text to be rendered as the VPA audio response at the set of spatially rendered audio locations by the wearable audio device; and rendering the API inputs at the wearable audio device in response to a user activating a spatialized VPA audio mode.

Implementations may include one of the following features, or any combination thereof.

In particular aspects, at least one of the look direction of the user or the location of the wearable audio device is indicated by sensor data from a sensor system in communication with the control system, where the sensor system includes at least one of: a global positioning system (GPS), an inertial measurement unit (IMU) or a camera.

In certain cases, the control system is further configured to adjust the spatially rendered audio location of the VPA audio response in response to at least one of: receiving updated sensor data indicating a change in the look direction of the user or a location of the wearable audio device, or receiving a VPA setting adjustment command from the user, where the VPA setting adjustment command includes at least one of: a user voice command, a user gesture command, or a settings adjustment on the wearable audio device.

In some implementations, the VPA command from the user includes a voice command detected by the at least one microphone, a tactile command detected by a tactile sensor in the sensor system or a gesture command detected by the inertial measurement unit (IMU) in the sensor system.

In particular cases, the control system is further configured to switch to a listen mode for the VPA command in response to sensor data indicating the user is positioned in a predetermined look direction.

In certain aspects, the control system is further configured to receive the VPA command from the user while in the listen mode, and provide the VPA audio response, without a wake command from the user.

In particular implementations, the control system is further configured to output the VPA audio response as a path of spatially rendered locations to direct the attention of the user along the direction of the path.

In some cases, the VPA audio response includes a menu of spatially delineated zones in an array defined relative to the look direction of the user, where the user can select between playback options in the array of spatially delineated zones using a voice command, a gesture command or a tactile command.

In certain aspects, the VPA audio response is at least one audio source option in an array of spatially delineated zones, where at least one additional audio source option in the array of spatially delineated zones includes a phone call source.

In particular cases, the VPA command includes a series of voice commands at varying look direction positions, and the control system is configured to update the spatially rendered audio location based upon natural language cues in the series of voice commands and corresponding look direction positions.

In some implementations, the VPA audio response includes background audio shared between the user and an additional user on a phone call.

In particular aspects, the VPA audio response includes a plurality of audio sources corresponding with spatially delineated zones in an array, where the plurality of audio sources comprise distinct callers on a conference call, and where the distinct callers are each arranged in one of the spatially delineated zones in the array.

In certain implementations, the VPA audio response further includes audio playback at two distinct spatially rendered audio locations.

In some cases, the audio playback at the two distinct spatially rendered audio locations includes two distinct audio feeds.

In particular aspects, adjusting the spatially rendered audio location of the VPA audio response is performed in response to at least one of: receiving updated sensor data indicating a change in the look direction of the user or a location of the wearable audio device, or receiving a VPA setting adjustment command from the user, where the VPA setting adjustment command includes at least one of: a user voice command, a user gesture command, or a settings adjustment on the wearable audio device.

In certain cases, the VPA command from the user includes a voice command detected by at least one microphone at the wearable audio device, a tactile command detected by a tactile sensor at the wearable audio device or a gesture command detected by an inertial measurement unit (IMU) in the wearable audio device.

In some aspects, the method further includes switching the wearable audio device to a listen mode for the VPA command in response to the sensor data indicating user is positioned in a predetermined look direction.

In particular implementations, the method further includes receiving the VPA command from the user while the wearable audio device is in the listen mode, and providing the VPA audio response, without a wake command from the user.

In certain cases, the VPA command includes a series of voice commands at varying look direction positions, and the method further includes updating the spatially rendered audio location based upon natural language cues in the series of voice commands and corresponding look direction positions.

In some implementations, the computer-implemented method further includes: running the spatialized VPA audio mode on the wearable audio device; receiving user interaction data from the spatialized VPA audio mode; and providing a spatialized VPA report after running the spatialized VPA audio mode on the wearable audio device and receiving the user interaction data, the spatialized VPA report including: a user heading for each user voice command received during the spatialized VPA audio mode; a user look direction associated with each user voice command; and a natural language understanding (NLU) intent classification for each user voice command and associated user look direction.

In certain aspects, the control system further compares the spatially rendered audio location of the VPA audio response with data indicating the look direction of the user, and updates the spatially rendered audio location in response to detecting a change in the look direction of the user.

In some implementations, the VPA audio response includes a virtual coach, where the spatially rendered audio location is placed at a distance relative to the user, and where the VPA audio response includes playback of audio content encouraging the user to move toward the spatially rendered audio location (e.g., milestone).

In particular cases, the spatially rendered audio location of the VPA audio response is calculated using a head related transfer function (HRTF).

In certain aspects, the VPA response includes at least one of a prerecorded binaural audio response to the VPA command or a text-to-speech (TTS) response to the VPA command.

In some implementations, the VPA audio response directs the user's attention in a look direction distinct from the user's current look direction, and in response to a user adjustment to the look direction of the VPA audio response, the control system is further configured to output an additional VPA audio response corresponding with the user's adjusted look direction.

In additional cases, a portion of the VPA audio response is output to direct the user's attention in a look direction distinct from the user's current look direction, and the control system delays or pauses playback of a remainder of the VPA audio response until detecting a user adjustment to the look direction of the VPA audio response.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
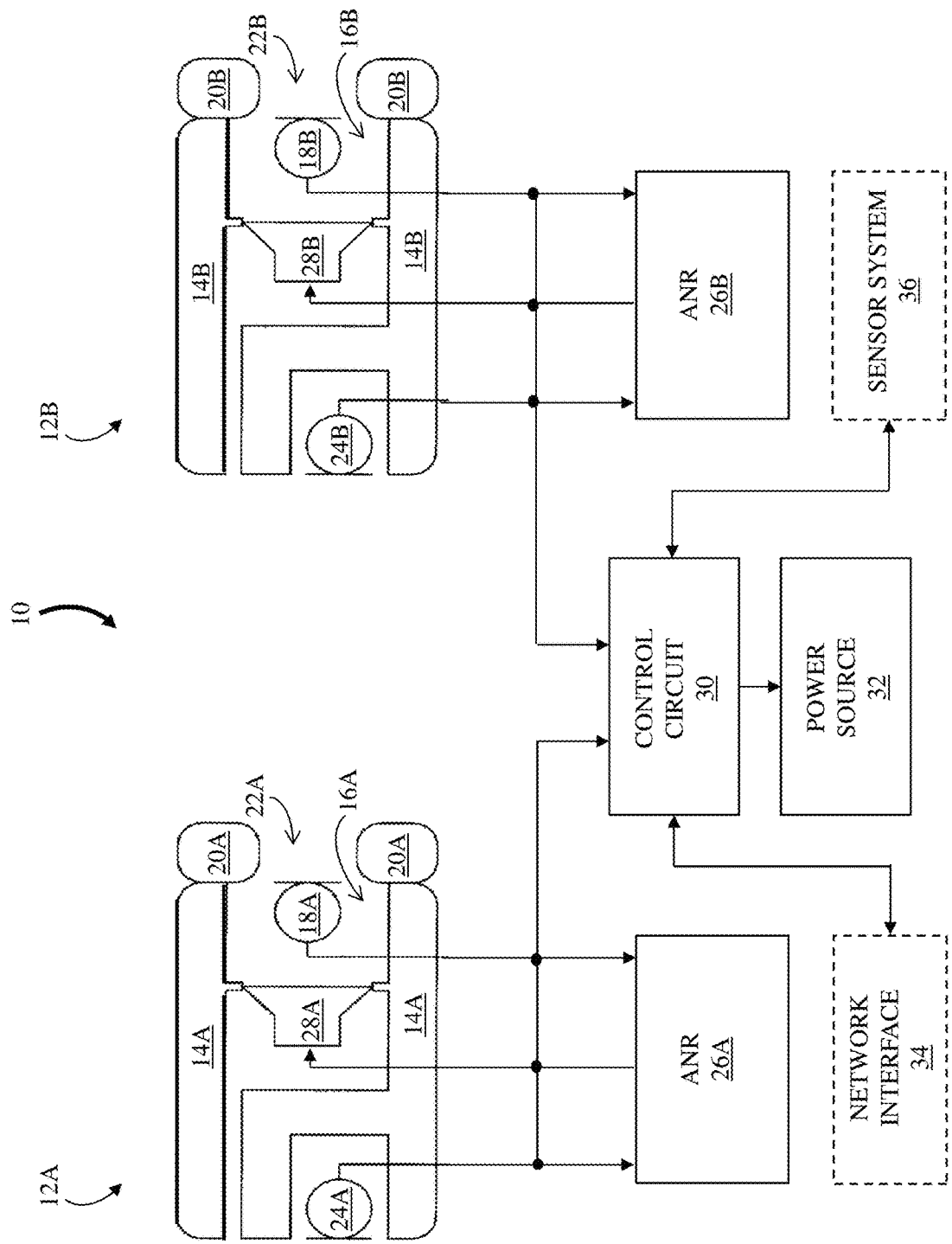
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a spatialized virtual personal assistant (VPA) can be beneficially incorporated into a wearable audio device to provide added functionality. For example, a spatialized VPA can enable, among other things, command interaction using gestures, inertial commands and directed voice commands. A spatialized VPA can also enhance user interaction with the wearable audio device, for example, by enabling intuitive spatialized commands. The disclosure is additionally based, at least in part, on the realization that an application programming interface (API) can be generated to allow a programmer to develop a spatialized VPA in a wearable audio device.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be acoustically presented with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses, headphones, earphones or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling spatialized VPA audio functions according to various particular implementations. It is understood that portions of the control circuit 30 (e.g., instructions) can also be stored in a remote location or in a distributed location, and can be fetched or otherwise obtained by the control circuit 30 (e.g., via any communications protocol described herein) for execution. The instructions may include instructions for controlling directional audio selection-based processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include inner microphones 18 and/or outer microphones 24, sensors for detecting inertial conditions at the personal audio device 10 and/or conditions of the environment proximate personal audio device 10 as described herein. The sensors may be on-board the personal audio device 10, or may be remote or otherwise wireless (or hard-wired) connected to the personal audio device 10. As described further herein, sensor system 36 can include a plurality of distinct sensor types for detecting inertial information, environmental information, or commands at the personal audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers gyroscopes and/or magnetometers. In some particular implementations, sensor system 36 can include a single IMU having three-dimensional (3D) accelerometers, gyroscopes and a magnetometer.

Advances in MEMS (microelectromechanical systems) technologies have enabled the manufacture of relatively low cost multi-axis accelerometers, gyroscopes, and magnetometers of small size and having relatively low power consumption using processes based on those employed in the microelectronics industry. Developments in this field have also resulted in the creation of relatively low cost MEMS devices that combine a multi-axis accelerometer, gyroscope, and/or magnetometer (sometimes referred to as an IMU or inertial measurement unit). In employing accelerometer(s), gyroscope(s) and/or magnetometer(s) in sensor system 36 to detect movement, look direction, and/or orientation, and in employing these observations concerning movement of the human body, it is possible both to detect movement imparted to the personal audio device 10 and to distinguish instances of that movement being caused by a user of that personal audio device 10 from instances of that movement being caused by some other influence. For example, where a user is traveling in a vehicle, it is possible to distinguish between movement made by the user from movement made by the vehicle. In this way, it is possible to detect that a personal audio device 10 is not in position on a user's head or body, even if that personal audio device 10 has been placed on a seat or elsewhere in moving vehicle, despite the fact that a moving vehicle will subject the personal audio device 10 to changes in acceleration and/or orientation as the vehicle moves.

In various implementations, the sensor system 36 can be located at the personal audio device 10, e.g., where an IMU is physically housed in the personal audio device 10. In some examples, the sensor system 36 (e.g., including the IMU) is configured to detect a position, or a change in position, of the personal audio device 10. This inertial information can be used to control various functions described herein. For example, the inertial information can be used to trigger a command function, such as activating an operating mode of the personal audio device 10 (e.g., a spatial audio mode), modify playback of an audio sample in the spatial audio mode, or initiate playback of audio content associated with one or more samples.

The sensor system 36 can also include one or more interface(s) for receiving commands at the personal audio device 10. For example, sensor system 36 can include an interface permitting a user to initiate functions of the personal audio device 10. In a particular example implementation, the sensor system 36 can include, or be coupled with, a capacitive touch interface for receiving tactile commands on the personal audio device 10.

In other implementations, as illustrated in the phantom depiction in FIG. 1, one or more portions of the sensor system 36 can be located at another device capable of indicating inertial, location, or other information about the user of the personal audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where personal audio device 10 includes headphones and an IMU is located in a pair of glasses, a watch or other wearable electronic device.

Figure 2:
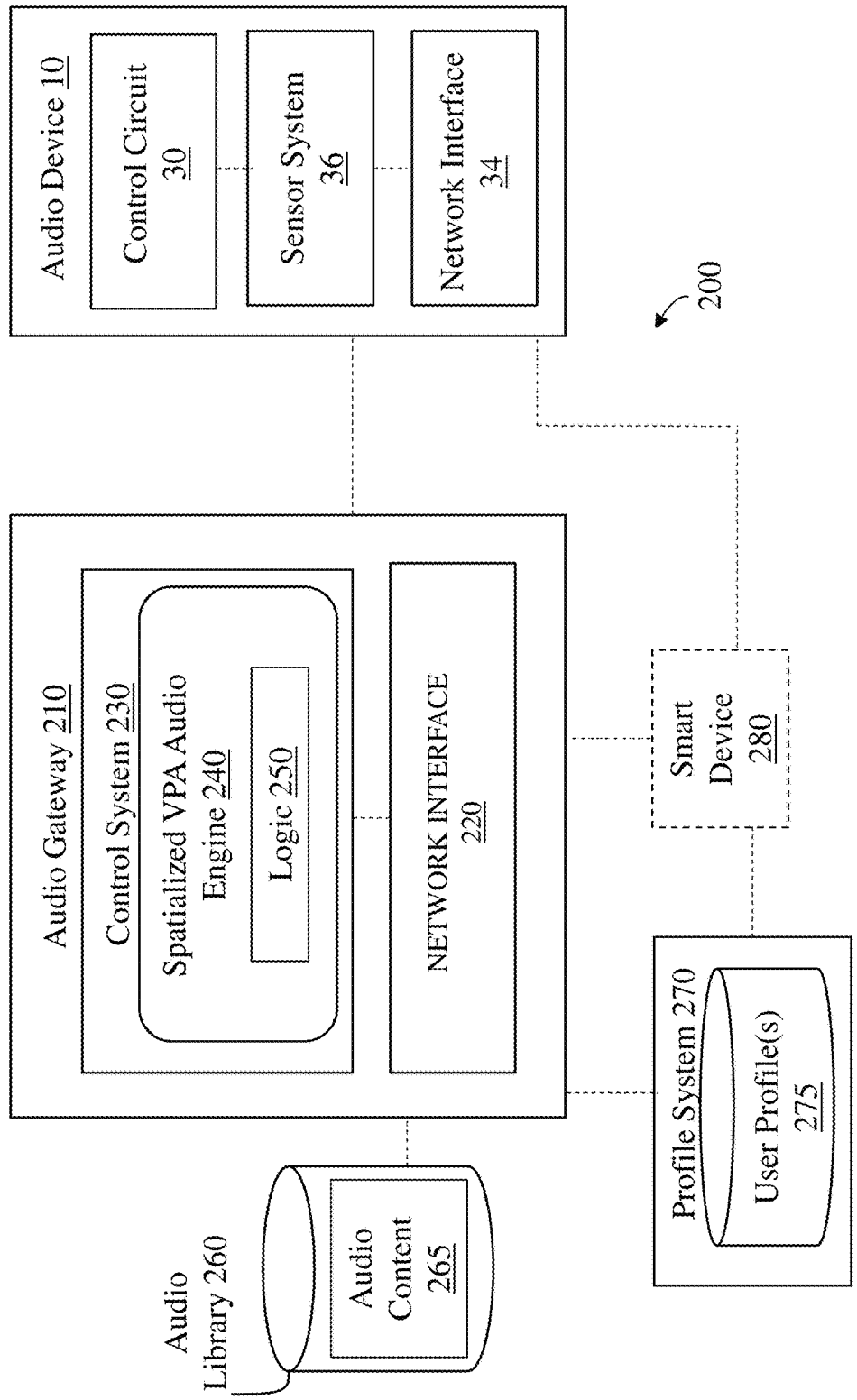
FIG. 2 shows a schematic depiction of data flows in a system including the personal audio device of FIG. 1, connected with an audio gateway device, according to various implementations.

As described with respect to FIG. 1, control circuit 30 can execute (and in some cases store) instructions for controlling spatialized VPA functions in personal audio device 10 and/or other audio playback devices in a network of such devices. FIG. 2 shows a schematic depiction of data flows in a system 200 including the personal audio device (or simply, audio device) 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include similar network interface components as described with reference to the network interface 34 of audio device 10, e.g., a wireless transceiver configured to communicate over any wireless protocol described herein.

Audio gateway 210 can further include a control system 230 configured to execute control functions in the spatialized VPA audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide spatialized VPA audio functions described herein.

In particular implementations, control system 230 includes a spatialized virtual personal assistant (VPA) audio engine 240 or otherwise accesses program code for executing processes performed by spatialized VPA audio engine 240 (e.g., via network interface 220). Spatialized VPA audio engine 240 can include logic 250 for executing functions described herein. Both audio gateway 210 and audio device 10 are shown in simplified form in FIG. 2 to focus illustration on functions described according to the spatialized VPA audio engine 240. Spatialized VPA audio engine 240 can be configured to implement modifications in audio outputs at the transducer (e.g., speaker) 28 (FIG. 1) at the audio device 10 in response to receiving a VPA command from a user (e.g., via one or more microphones in the sensor system 36 or in a paired smart device). In various particular embodiments, spatialized VPA audio engine 240 is configured to receive a VPA command from a user, and instruct the control circuit 30 at the audio device 10 to output a VPA audio response at the transducer(s) 28 (FIG. 1) according to a VPA setting, a location of the audio device 10, the look direction of the user and/or a type of the VPA command. In particular cases, the VPA audio response is output at a spatially rendered audio location defined relative to the user's look direction or relative to a physical location proximate the user.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations.

In particular implementations, the logic 250 in spatialized VPA audio engine 240 is configured to process sensor data, contextual data, and/or user input data from the audio device 10 and/or additional sources (e.g., smart device 280, profile system 270, etc.) and execute various functions. For example, the spatialized VPA audio engine 240 is configured to receive a VPA command from a user (e.g., via one or more interfaces and/or sensors described herein, such as interfaces and/or sensors in sensor system 36 and/or a separate smart device 280). In response to that VPA command, the spatialized VPA audio engine 240 can output (e.g., via transducer(s) 28 at audio device 10) a VPA audio response in a spatially rendered audio location that is defined relative to a look direction of the user (e.g., the user's head direction or eye focus direction) or relative to a physical location proximate the user. In various implementations, the spatialized VPA audio engine 240 outputs the VPA audio response according to a VPA setting, a location of the audio device 10, the look direction of the user, contextual information about what a user is doing, and/or a type of the VPA command.

Spatialized VPA audio engine 240 (including logic 250, related software and/or hardware) can be located at the audio device 10, audio gateway 210 or any other device described herein (e.g., smart device 280). That is, spatialized VPA audio engine 240 can be configured to execute functions at one or more devices and/or components described herein. In some cases, the spatialized VPA audio engine 240 may take the form of an entirely hardware implementation, an entirely software implementation (including firmware, resident software, micro-code, etc.) or an implementation combining software and hardware aspects that may all generally be referred to herein as an "engine." Additionally, the spatialized VPA audio engine 240 may take the form of a computer program product embodied in any tangible medium of expression having computer-usable program code embodied in the medium. In various particular implementations, the spatialized VPA audio engine 240 executes functions described herein according to logic 250, which can be stored or otherwise accessed by any device capable of performing those functions, e.g., audio gateway 210, audio device 10 or other device(s) described herein.

Spatialized VPA audio engine 240 can be coupled (e.g., wirelessly and/or via hardwired connections in personal audio device 10) with an audio library 260, which can include audio content 265 (e.g., audio file(s), playlist(s) of audio files, podcast(s), an audio stream or an Internet radio station, location-specific audio pins, one or more audibly presented selections) for playback (e.g., streaming) at audio device 10 and/or a profile system 270 including user profiles 275 about one or more user(s). Audio library 260 can include any library associated with digital audio sources accessible via network interfaces 34 and/or 220 described herein, including locally stored, remotely stored or Internet-based audio libraries. While the audio library 260 and/or profile system 270 can be located at one or more remote devices, e.g., in a cloud-based system or at a remote storage device, it is understood that the audio library 260 and/or the profile system 270 could be integrated in any of the devices shown and described in FIG. 2, e.g., at the audio device 10, audio gateway 210 and/or smart device(s) 280.

In particular implementations, as noted herein, audio content 265 can include any audibly presentable material that can be provided to the user after making a VPA command. As described herein, audio content 265 can include a VPA audio response such as a VPA voice response to a command or a question. For example, where the VPA command includes a voice command or a question (e.g., "Assistant, what is today's weather forecast?", or, "Tell me about this restaurant in front of me"), the VPA audio response can include playback of a voice response (e.g., "The high temperature today will be 65 degrees, and it will be mostly cloudy", or, "The restaurant in front of you is called 'The Steakhouse' and serves locally sourced meats in an a-la-carte style").

In other cases, the audio content 265 can be presented to the user with one or more associated audio samples, which may include a portion (or all) of the audio content 265, or any other associated audibly presentable material. That is, in certain cases, the term "audio sample" can refer to any audibly presented material associated with audio content 265, and can include a portion of audio content 265, or other audibly presented material altogether, which indicates the source of that content 265. This sample need not be a part of the underlying audio content 265, and may merely serve to identify audio content 265 and/or its source. In some example implementations, when the user makes a VPA command, spatialized VPA audio engine 240 provides the user with audio samples and/or audio responses in an array of spatially delineated zones. The user can select between these samples/responses in the array to actuate additional functions of the spatialized VPA audio engine 240, e.g., to initiate playback of the source of audio content 265 associated with the selected audio sample. Samples (and associated content 265) can include music choices, navigation/direction choices, news source choices, audio messages, general information about a location, safety alerts, location-specific audio pins, audio beacons, etc. Additional description of audio pins, location-specific messages, audio beacons and related content can be found in U.S. Provisional Patent Application No. 62/626,967, which is herein incorporated by reference in its entirety. Application of spatialized audio functions in particular devices is further described in U.S. patent application Ser. No. 15/908,183, which is herein incorporated by reference in its entirety.

As noted herein, in various implementations, the audio content 265 can be settings-specific, location-specific, specifically tailored to a VPA query, or otherwise tailored to particular user experiences. In some cases, spatialized VPA audio engine 240 presents audio content 265 to the user that is related to a particular location, e.g., when the user approaches that location. In example implementations, when a user is at an intersection, spatialized VPA audio engine 240 can present audio prompts, beacons or other indicators to the user based upon the direction in which the user is facing (e.g., looking) (detected according to various implementations described herein). For example, when the user at an intersection makes a VPA command (or has already activated the spatialized VPA audio engine 240 or otherwise triggers settings to activate the spatialized VPA audio engine 240), looking left can trigger the spatialized VPA audio engine 240 to provide particular audio content 265 (e.g., an audio prompt or audio beacon in a spatially rendered audio location defined relative to the user's look direction) indicating areas of interest in that direction. Looking right can trigger the spatialized VPA audio engine 240 to provide audio content 265 (in a spatially rendered audio location defined relative to the different look direction) indicating areas of interest in that direction. Additionally, looking straight ahead can trigger spatialized VPA audio engine 240 to provide audio content indicating areas of interest in that direction, again in a spatially rendered audio location defined relative to the user's look direction.

In some cases, the audio content 265 can provide introductory information about additional content associated with one or more of the directions, e.g., as a sample. In the intersection example: a) when looking right (during operation of the spatialized VPA audio mode), spatialized VPA audio engine 240 can provide an audio sample such as: "Fenway Park is 0.5 miles from your current location in this direction; nod your head to hear highlights from last night's game"; b) when looking left (during operation of the spatialized VPA audio mode), spatialized VPA audio engine 240 can provide an audio sample such as: "Boston's Public Garden is 0.4 miles from your current location in this direction; tap your audio device to hear fun facts about this historic public gathering place"; and/or c) when looking straight ahead (during operation of the spatialized VPA audio mode), spatialized VPA audio engine 240 can provide an audio sample such as: "You are two blocks from Newbury Street; walk forward to hear a listing of top-rated restaurants for lunch." It is understood that this example is merely illustrative of the various array layouts and audio sample types that can be utilized by spatialized VPA audio engine 240 in spatial audio mode. Various additional example implementations are described herein.

User profiles 275 may be user-specific, community-specific, device-specific, location-specific or otherwise associated with a particular entity such as the user. User profiles 275 can include user-defined playlists of digital music files, audio messages stored by the user of audio device 10, or another user, or other audio content available from network audio sources coupled with network interfaces 34 and/or 220, such as network-attached storage (NAS) devices, and/or a DLNA server, which may be accessible to the audio gateway 210 and/or audio device 10 over a local area network such as a wireless (e.g., Wi-Fi) or wired (e.g., Ethernet) home network, as well as Internet music services such as Pandora®, vTuner®, Spotify®, etc., which are accessible to the audio gateway 210 and/or audio device 10 over a wide area network such as the Internet. In some cases, profile system 270 is located in a local server or a cloud-based server, similar to any such server described herein. User profile 275 may include information about frequently played audio content associated with the user of audio device 10 or other similar users (e.g., those with common audio content listening histories, demographic traits or Internet browsing histories), "liked" or otherwise favored audio content associated with the user or other similar users, frequency with which particular audio content is changed by the user or other similar users, etc. Profile system 270 can be associated with any community of users, e.g., a social network, subscription-based music service (such as a service providing audio library 260), and may include audio preferences, histories, etc. for the user as well as a plurality of other users. In particular implementations, profile system 270 can include user-specific preferences (as profiles 275) for messages and/or related notifications (e.g., prompts, audio overlays). Profiles 275 can be customized according to particular user preferences, or can be shared by users with common attributes.

As shown herein, spatialized VPA audio engine 240 can also be coupled with a separate smart device 280. The smart device 280 is shown in phantom because it may be a separate component from the device executing the spatialized VPA audio engine 240, however, it is understood that in various embodiments, the audio gateway 210 is located at a smart device 280 (e.g., a smart phone, smart wearable device, etc.). The spatialized VPA audio engine 240 can have access to a user profile (e.g., profile 275) or biometric information about the user of audio device 10. In some cases, the spatialized VPA audio engine 240 directly accesses the user profile and biometric information, however, in other cases, the spatialized VPA audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. However, as noted herein, in some cases the audio gateway 210 is located at a smart device such as the smart device 280. In some example implementations, smart device 280 can be utilized for: connecting audio device 10 to a Wi-Fi network; creating a system account for the user; setting up music and/or location-based audio services; browsing of content for playback; setting preset assignments on the audio device 10 or other audio playback devices; transport control (e.g., play/pause, fast forward/rewind, etc.) for the audio device 10; and selecting one or more audio devices 10 for content playback (e.g., single room playback or synchronized multi-room playback). In some cases, smart device 280 may also be used for: music services setup; browsing of content; setting preset assignments on the audio playback devices; transport control of the audio playback devices; and selecting audio devices 10 (or other playback devices) for content playback. Smart device 280 can further include embedded sensors for measuring biometric information about user, e.g., travel, sleep or exercise patterns; body temperature; heart rate; or pace of gait (e.g., via accelerometer(s)). In various implementations, one or more functions of the spatialized VPA audio engine 240 can be executed at smart device 280. Further, it is understood that audio gateway 210 can include any manner of smart device described herein.

As described herein, spatialized VPA audio engine 240 is configured to receive sensor data about one or more conditions at the audio device 10 from sensor system 36. In various particular implementations, the sensor system 36 can include an IMU for providing inertial information about the audio device 10 to the spatialized VPA audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the VPA audio engine 240, including logic 250, is configured to calculate spatially rendered audio locations proximate the audio device for audio output using inputs such as audio pin angle, IMU azimuth angle and persistent azimuth, as described in U.S. patent application Ser. No. 15/908,183.

In additional implementations, sensor system 36 can include additional sensors for detecting conditions at the audio device, for example: a position tracking system; and a microphone (e.g., including one or more microphones). These sensors are merely examples of sensor types that may be employed according to various implementations. It is further understood that sensor system 36 can deploy these sensors in distinct locations and distinct sub-components in order to detect particular environmental information relevant to user of audio device 10.

In certain cases, the position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user and/or the audio device 10. In this sense, the IMU may form part of the position tracking system. However, in other implementations, orientation tracking can be performed via other components in the position tracking system, e.g., a separate head-tracking or body-tracking system (e.g., an optical-based tracking system, accelerometer, magnetometer, gyroscope or radar) for detecting a direction in which the user is facing, as well as movement of the user and the audio device 10. The position tracking system can be configured to detect changes in the physical location of the audio device 10 and/or the user (where the user is separated from audio device 10) and provide updated sensor data to the spatialized VPA audio engine 240 in order to indicate a change in the location of the user. The position tracking system can also be configured to detect the orientation of the user, e.g., a direction of the user's head (e.g., where the user is looking), or a change in the user's orientation such as a turning of the torso or an about-face movement. In these examples, the IMU at audio device 10 may be particularly useful in detecting changes in user orientation. However, it is understood that the position tracking system could also include one or more optical or visual detection systems (e.g., camera(s)) located at the audio device 10 or another device (e.g., the audio gateway 210 and/or smart device 280) configured to detect the orientation of the user.

In some example implementations, this position tracking system (e.g., IMU) can detect that the user has changed his/her look direction, that is, the orientation of his/her head while the spatialized VPA audio mode is active, and can send that sensor data (e.g., inertial information) to the spatialized VPA audio engine 240. In particular example implementations, the position tracking system can utilize one or more location systems and/or orientation systems to determine the location and/or orientation of the user, e.g., relying upon a GPS location system for general location information and an IR location system for more precise location information, while utilizing a head or body-tracking system such as the IMU to detect a direction of the user's viewpoint (also referred to as the look direction). In any case, the position tracking system can provide sensor data to the spatialized VPA audio engine 240 about the position (e.g., location and/or orientation) of the user so that the spatialized VPA audio engine 240 can update the location of the VPA audio based on the updated position of the user.

In some cases, the IMU, which can include an accelerometer/gyroscope/magnetometer, can include distinct accelerometer components gyroscope components and/or magnetometer components, or could be collectively housed in a single sensor component. This component may be used to sense gestures based on movement of the user's body (e.g., head, torso, limbs) while the user is wearing the audio device 10 or interacting with another device (e.g., smart device 280) connected with audio device 10. As with any sensor in sensor system 36, accelerometer(s)/gyroscope(s)/magnetometer(s) may be housed within audio device 10 or in another device connected to the audio device 10. In some example implementations, the accelerometer(s)/gyroscope(s)/magnetometer(s) can detect inertial information about the user, e.g., an acceleration of the user and/or audio device 10 or a deceleration of the user and/or audio device 10.

The microphone (which can include one or more microphones, or a microphone array) in sensor system 36 can have similar functionality as the microphone(s) 18 and 24 shown and described with respect to FIG. 1, and may be housed within audio device 10 or in another device connected to the audio device 10. Microphone(s) can be positioned to receive ambient acoustic signals (e.g., acoustic signals proximate audio device 10) or acoustic signals within audio device 10 (e.g., acoustic signals near a wearer's ear canal). In some cases, ambient acoustic signals include speech/voice input from the user to enable voice control functionality, or to initiate a spatialized VPA audio mode. In some other example implementations, the microphone(s) can detect the voice of the user of audio device 10 and/or of other users proximate to or interacting with the user. In particular implementations, spatialized VPA audio engine 240 is configured to analyze one or more voice commands from user (via microphone(s)), and modify the audio output at the audio device 10 (e.g., via transducer(s) 28) based upon that command. In some cases, the microphone(s) can allow the user to initiate a spatialized VPA audio mode at the audio device 10 using a voice command at microphone(s) 18 and 24 at audio device 10, or at other microphone(s) on another device (e.g., smart device 280 and/or audio gateway 210). In some examples, the user can provide a voice command to the spatialized VPA audio engine 240, e.g., to control the spatialized VPA audio mode. In these cases, logic 250 can include logic for analyzing voice commands, including, e.g., natural language processing (NLP) logic or other similar logic.

It is understood that any number of additional sensors can be incorporated in sensor system 36, and can include temperature sensors or humidity sensors for detecting changes in weather within environments, physiological sensors for detecting physiological conditions of the user (e.g., one or more biometric sensors such as a heart rate sensor, a photoplethysmogram (PPG), electroencephalogram (EEG), electrocardiogram (ECG) or EGO) optical/laser-based sensors and/or vision systems for tracking movement or speed, light sensors for detecting time of day, additional audio sensors (e.g., microphones) for detecting human or other user speech or ambient noise, etc.

In additional implementations, the spatialized VPA audio engine 240 can alternatively (or additionally) be configured to implement modifications in audio outputs at the transducer (e.g., speaker) 28 (FIG. 1) at audio device 10 in response to receiving additional information from audio device 10 or another connected device such as smart device 280 and/or audio gateway 210. For example, a Bluetooth beacon (e.g., BLE beacon) trigger, GPS location trigger or timer/alarm mechanism can be used to initiate the spatialized VPA audio mode at audio device 10. These triggers and mechanisms can be used in conjunction with other actuation mechanisms described herein (e.g., voice actuation, gesture actuation, tactile actuation) to initiate the spatialized VPA audio mode. In some cases, the spatialized VPA audio mode can be initiated based upon proximity to a detected BLE beacon or GPS location. In other cases, the spatialized VPA audio mode can be initiated based upon a timing mechanism, such as at particular times or intervals.

However, in still other cases, the spatialized VPA audio mode can be a default mode for the audio device 10. In these cases, the user can save a default setting or the audio device 10 can have an original device setting that enables the spatialized VPA audio mode without requiring a trigger from another device and/or sensor. According to these implementations, the spatialized VPA audio engine 240 is configured to output the VPA audio response to the user's VPA command without requiring additional input information, such as sensor information or device input(s).

As additionally noted herein, the spatialized VPA audio engine 240 can be configured to detect or otherwise retrieve contextual data about the user and/or usage of the audio device 10. For example, the spatialized VPA audio engine 240 can be configured to retrieve contextual data from one or more applications running at the audio gateway 210 and/or the audio device 10, such as a calendar or organizational application, e-mail or messaging application, etc. The spatialized VPA audio engine 240 can also be configured to detect that the user is engaging one or more device functions, for example, that the user is on a phone call or actively sending/receiving messages with another user using the audio gateway 210.

During operation, the spatialized VPA audio engine 240 can be configured to output a VPA audio response in response to a user VPA command. As described herein, the VPA command can take any form capable of detection at the audio device 10, audio gateway 210 and/or smart device 280. For example, the VPA command can include a tactile actuation, gesture actuation or a voice command received at the audio device 10 or at another device such as the audio gateway 210 or the smart device 280 (e.g., via sensor system(s) described herein). In particular cases, the user can initiate the spatialized VPA audio mode by speaking a command such as: "Assistant, play happy music." In some cases, a trigger phrase is not necessary for an effective initiation command, and a user may simply say: "Play happy music." In other cases, the user can initiate the spatialized VPA audio mode with a tactile cue such as a tap or multi-tap actuation at the audio device 10, audio gateway 210 and/or smart device 280. In particular implementations, the tactile actuation can include a double-tap or triple-tap on any portion of the audio device 10, or on a particular interface at the audio device 10 (e.g., a capacitive touch interface). However, the user can also actuate the spatialized VPA audio mode using a tactile command (e.g., touch and pause command, tap command, swipe command) on the smart device 280, e.g., where smart device 280 includes a watch or other wearable device. In other cases, the user can initiate the spatial audio mode with a gestural cue, such as a deep head nod, a look in a particular direction, or a look-and-pause command, which can be detected at the audio device 10 (e.g., via an IMU) or at the audio gateway 210 and/or smart device 280 (e.g., with optical sensors or proximity sensors).

The audio gateway 210 can also include an interface permitting the user to deliver an initiation command, such as a touch-screen command or push-button command. However, in some particular implementations, the user can initiate the spatialized VPA audio mode without contacting a user interface on the audio gateway 210 (e.g., without taking a smart device 280 out of his/her pocket). In still further implementations, the user can initiate the spatial audio mode using a gesture, such as a gesture detectable at the audio device 10 and/or smart device 280. For example, the user can initiate the spatialized VPA audio mode using a head nod or twist, in the case that the audio device 10 and/or smart device 280 includes a head tracking system. In other examples, the user can initiate the spatialized VPA audio mode using a wrist rotation or arm wave, using an IMU or other accelerometer(s)/gyroscope(s)/magnetometer(s) at the audio device 10 and/or smart device 280. Gesture and/or voice commands can be beneficial for users who want to limit interaction with visual interfaces such as screens. In any case, the user can initiate the spatialized VPA audio mode using one or more connected devices.

As described herein, the VPA audio response is output in a spatially rendered audio location that is defined relative to the user's look direction and/or relative to a physical location proximate the user. For example, the VPA audio response can include a VPA voice response that appears to originate from a location in three-dimensional space in front of the user, behind of the user, at the periphery of the user, above or below the user, or any location in between. In some cases, the VPA voice response can include a plurality of voice responses that are rendered in distinct spatially delineated zones (e.g., in an array). In other cases, the VPA voice response is triggered with any command described herein, which may not require a voice or gesture command.

FIGS. 3-10 illustrate example environments demonstrating a user 310 interacting with the spatialized VPA audio engine 240. In these examples, the user 310 is wearing an audio device 10, e.g., a pair of earbuds, where only one earbud may be visible due to the perspective. The user 310 is also illustrated wearing a smart device 280 in some cases, for example, a smart watch. As described herein, the spatially rendered audio location of the VPA voice response can be defined relative to the look direction of the user 310 (e.g., as determined by one or more sensors such as the IMU) or relative to a physical location proximate the user (e.g., as determined by the location of a landmark, magnetic north, or a direction of the user's motion), and/or according to one or more sensor inputs, e.g., a VPA setting (such as profile settings in the user profile(s), settings saved in the spatialized VPA audio engine 240, or settings defined by a user input), a location of the audio device 10 (e.g., as indicated by sensor data from the sensor system 36 and/or other smart device(s)), contextual information about what a user is doing (e.g., calendar information from the user profile 275 or an organizational application running at the audio gateway 210, or data from the audio gateway 210 indicating the user is on a phone call), or a type of the VPA command from the user 310. Various features of the spatialized VPA audio engine 240 are described in the context of these examples.

Figure 3:
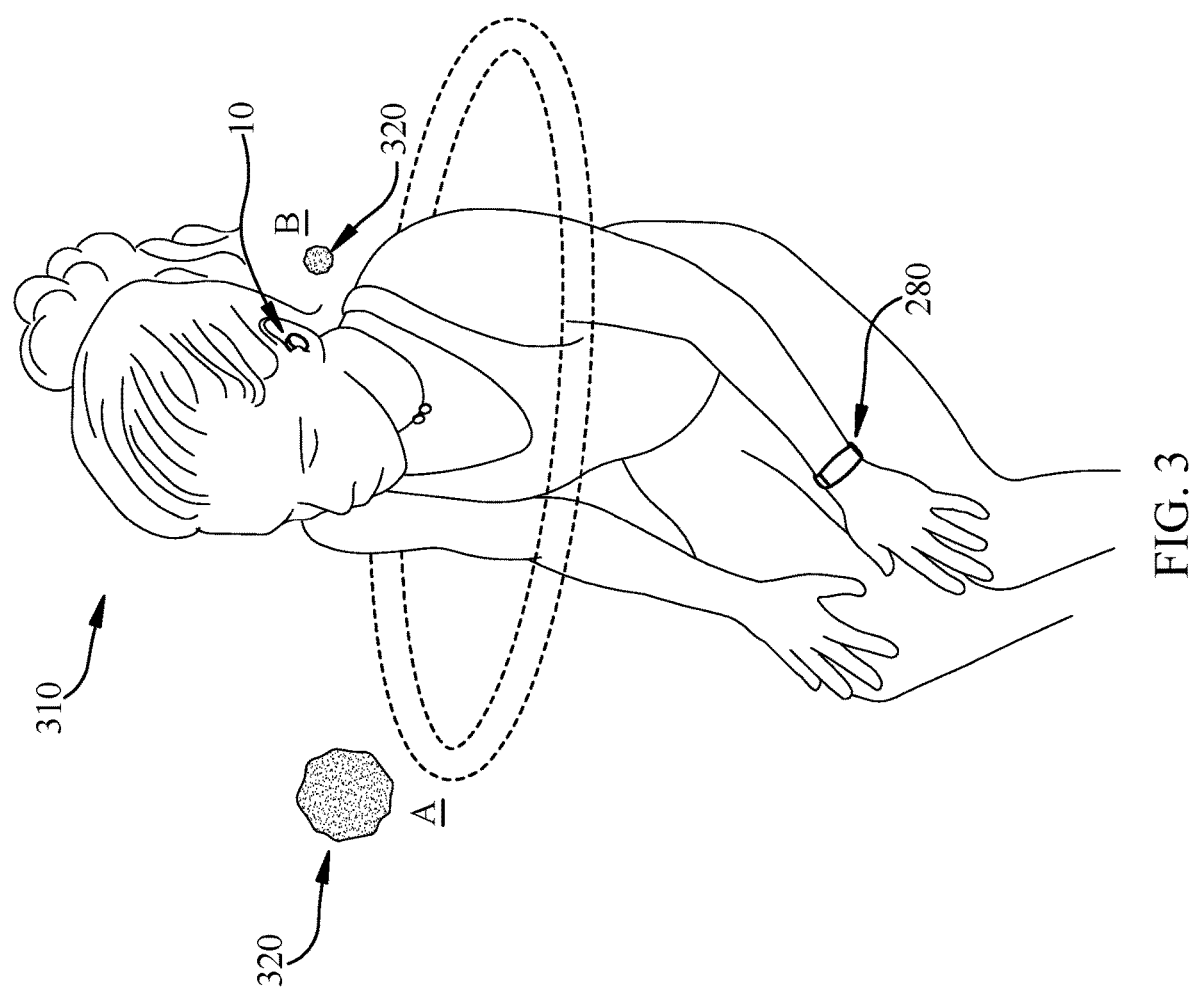
FIG. 3 shows a schematic depiction of an environment including a user interacting with the audio device of FIGS. 1 and 2, according to various implementations.

FIG. 3 illustrates a first example implementation of a spatialized voice interface, illustrating a VPA voice response 320 in two spatially rendered audio locations (A, B). In some implementations, the spatially rendered audio locations A, B illustrate independent VPA voice responses 320, which may be output at different times. For example, the VPA voice response 320 output at location A can include a forward-oriented response such as walking directions (e.g., "Walk three blocks straight ahead before taking a left onto Commonwealth Avenue") or information about an attraction in front of the user 310 (e.g., "Coming up at this intersection is the childhood home of Mozart"). While the example of FIG. 3 shows location A as a forward-oriented response, it is to be understood that other locations in the 360 degree space around the user could be used to draw the user's attention in a particular direction depending on the context, settings for the spatialized VPA, the type of VPA command, and/or data from one or more sensor inputs. The VPA voice response 320 at location B can be reserved for responses that are otherwise not forward-oriented. For example, the VPA voice response 320 at location B can include a reminder (e.g., "You have a meeting downtown in 15 minutes"), news, weather or other information (e.g., "The forecast is calling for rain in 30 minutes").

In other example implementations, the VPA audio responses 320 can be rendered at the two distinct locations A, B at the same or nearly the same time. In these cases, the VPA audio responses 320 can be related to one another, and may involve a choice between two options (e.g., the response 320 at location A can suggest buying Brand X of laundry detergent with a rationale while the response 320 at location B can suggest buying Brand Y of laundry detergent with a different rationale). Responding to the same set of cues from the user 310, both VPA audio responses 320 can be rendered, e.g., in succession, or in a back-and-forth manner. These example implementations may be beneficial when comparing options. However, these implementations can also be used in listening to audio content, e.g., music, audio books, or podcasts. In one example, the VPA audio responses 320 can include two distinct audio feeds, such as distinct audio content 265 (FIG. 2). The spatialized VPA audio engine 240 can detect user settings that indicate audio playback of a first type of content is to be located at a first location (e.g., music station A at location A) and audio playback of a second type of content is to be located at a second, distinct location (e.g., music station B at location B).

In various implementations, the spatialized VPA audio engine 240 is configured to adjust the location(s) of the VPA audio response(s) 320 in response to receiving updated sensor data indicating a change in the look direction of the user 310, a location of the audio device 10 and/or a location of the smart device 280, in response to receiving a VPA setting adjustment command from the user 310, or in response to receiving other information indicating the user is in a different environment or context where the output of the audio response may need to be adjusted. In some cases, the user settings or operating mode settings (e.g., default or previously saved settings for an operating mode) may dictate that the VPA audio response 320 be located at the left side of the users' head, regardless of the look direction of the user. In these cases, as the user 310 moves her head in one direction (e.g., left or right), the VPA audio response 320 can shift with that head movement. In additional cases, the user settings or operating mode settings may dictate that the VPA audio response 320 be located to the right of the user 320 when she is sitting on her couch or her favorite chair.

In still other cases, other features of the VPA audio response 320 can be adjusted based upon the location of the response. For example, the spatialized VPA audio engine 240 can control the volume of the VPA audio response 320 and/or apply other acoustic effects (e.g., fading, different equalization, augmenting with an audible tone or audio clip to identify the message, etc.) based upon the location of the VPA audio response 320. For example, the spatialized VPA audio engine 240 can provide the VPA audio response 320 at a lower volume when the spatialized location of that response is closer to the user's ear (e.g., at location B, FIG. 3) than when the spatialized location of that response is farther from the user's ear (e.g., at location A, FIG. 3). In some additional cases, a tone or introduction (e.g., "weather update", or "calendar invite") is provided prior to the VPA audio response 320 at one or more of the locations to indicate the nature of the message before it begins. As with other preferences described herein, these preferences can be user-defined or default settings for particular devices or operating modes.

Figure 4:
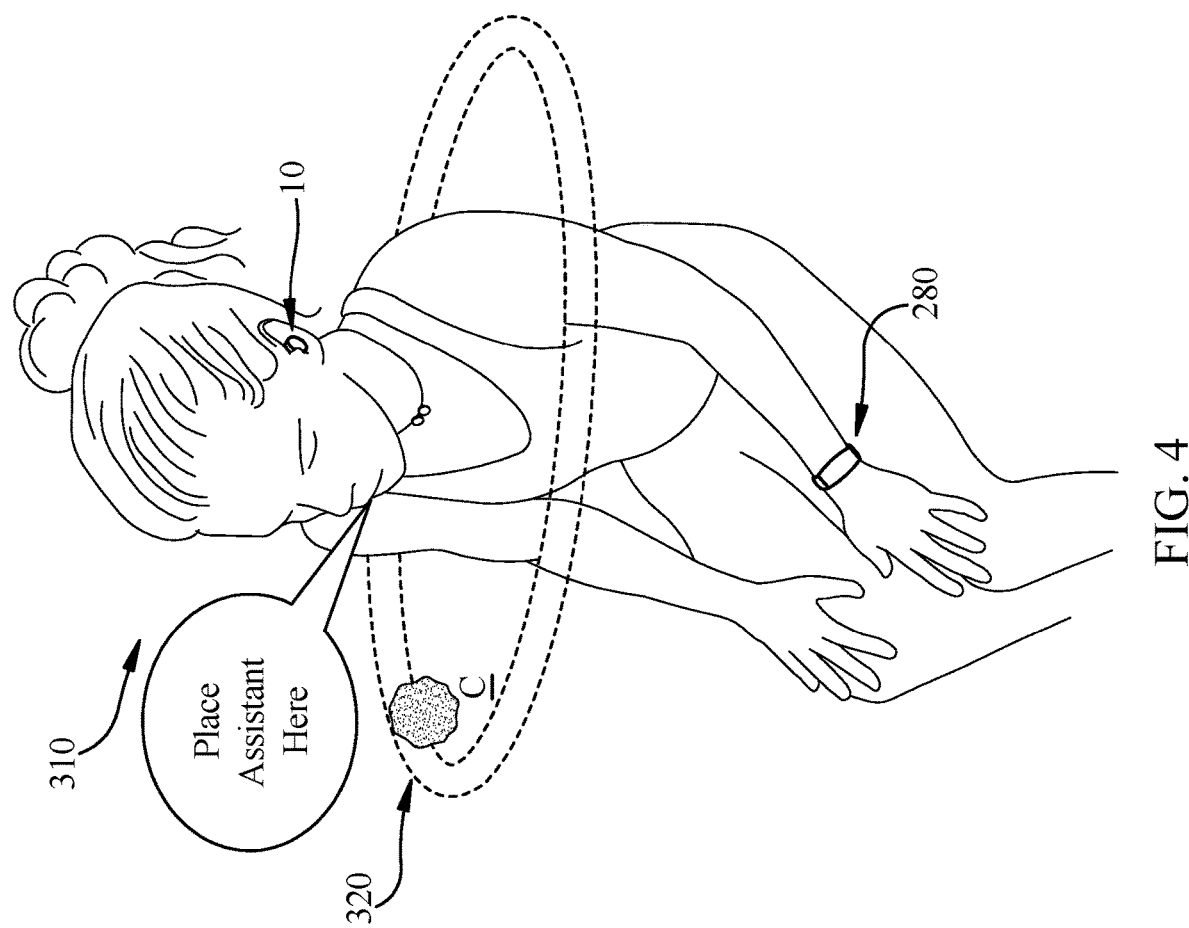
FIG. 4 shows a schematic depiction of an environment including a user interacting with the audio device of FIGS. 1 and 2, according to various additional implementations.

In still other examples, as illustrated in FIG. 4, the spatialized VPA audio engine 240 is configured to adjust the location(s) of the VPA audio response(s) in response to receiving a VPA setting adjustment command from the user 310. FIG. 4 illustrates the user 310 providing a voice command to the spatialized VPA audio engine 240 regarding a location (location C) for the VPA audio response 320. In this example, the user 310 provides the voice command that is detected by at least one microphone in the sensor system 36. The VPA setting adjustment command can include a key word such as "Assistant" or its equivalent in order for the spatialized VPA audio engine 240 to process the command as a settings adjustment command. For example, the user 310 may say, "Place Assistant here" while looking in a direction. In some cases, the spatialized VPA audio engine 240 can determine the user's look direction at the time of the received voice command, and can place the VPA audio response 320 in a location relative to that look direction (e.g., in front of the user 310, or off to a side of the user 310, depending upon the user settings). The spatialized VPA audio engine 240 is then configured to respond to the next VPA command (e.g., voice command) from the user 310 with a VPA audio response 320 at the spatially rendered audio location.

While the VPA setting adjustment command is illustrated as a voice command, it is understood that the user 310 can alternatively provide any command for adjusting the location of the VPA audio response 320, e.g., a tactile command such as a gesture on an interface (e.g., a capacitive touch interface or other touch interface), or a gesture command that is detectable by the sensor system 36 (e.g., by turning her head, waving her arm, etc.).

In additional cases, the user can configure different types of VPA detection cues and/or VPA audio response 320 in different spatially rendered locations. For example, the user can adjust the location of the VPA audio response 320 by looking to her far left and saying, "Place weather here," and looking to her far right and saying, "Place calendar reminders here." In these cases, the spatialized VPA audio engine 240 is additionally configured to provide the VPA audio response 320 to a VPA command from the user based upon the category of the command, for example, where categories correspond with distinct sources of content provided in the VPA audio response 320. Example sources can include any application described herein, e.g., weather, calendar, navigation, etc. The spatialized VPA audio engine 240 can also be configured to only respond to VPA commands when the user's look direction corresponds with a predefined look direction for the content requested. In these cases, the user or settings define that the spatialized VPA audio response 320 for a particular source (e.g., navigation, calendar) is only rendered in response to the VPA command made while the user is in the predefined look direction (e.g., looking far left, or looking far right). When the user makes a VPA command while not in the corresponding predefined look direction, the spatialized VPA audio engine 240 may ignore the command, or otherwise not take action.

Figure 5:
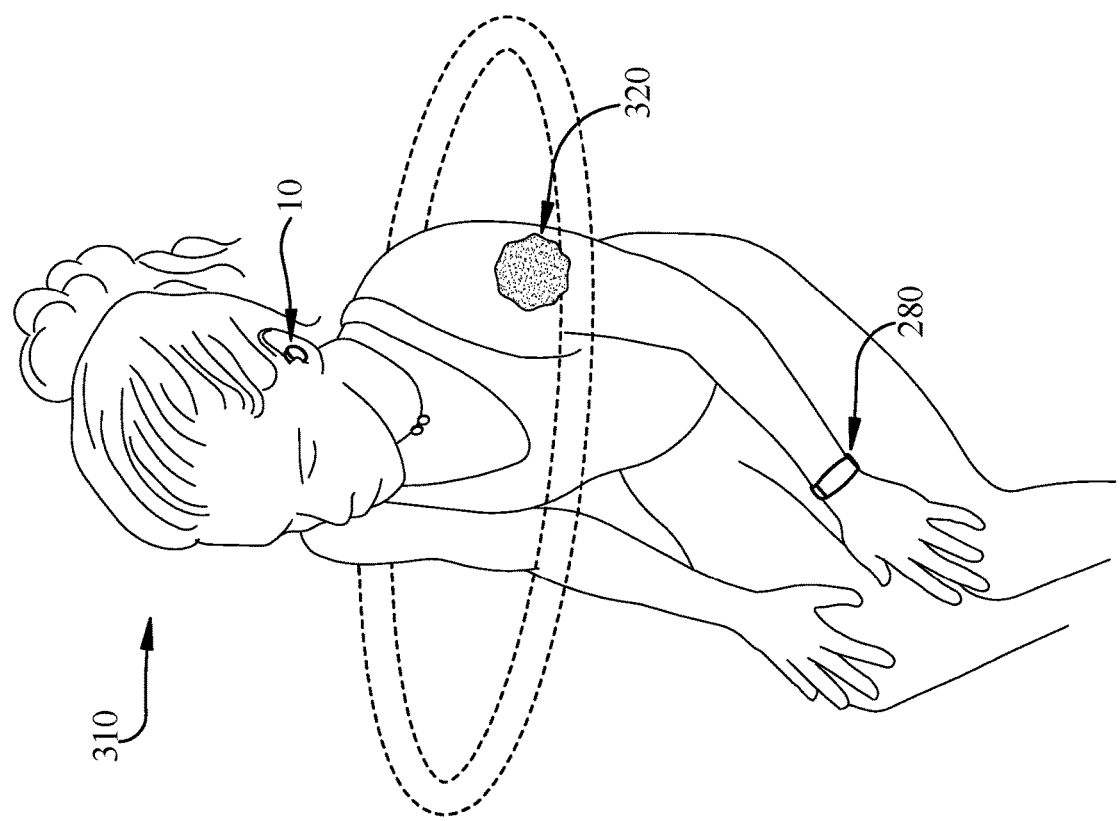
FIG. 5 shows a schematic depiction of an environment including a user interacting with the audio device of FIGS. 1 and 2, according to further implementations.

FIG. 5 illustrates an additional example implementation, where the VPA audio response 320 remains in a location "in wait" for the user 310 to look in that direction and make a VPA voice command. In these cases, the spatialized VPA audio engine 240 is configured to switch to a listen mode for the VPA command in response to sensor data indicating the user 310 is positioned in a predetermined look direction. For example, the user 310 can designate that the VPA audio response 320 be located in a predetermined look direction by a settings adjustment, e.g., made via one or more interfaces described herein. For example, as described with reference to the example in FIG. 4, the user 310 can instruct the spatialized VPA audio engine 240 to "place" the VPA audio response 320 at a location left of center (e.g., 15-25 degrees rotation from a directly forward look direction). In response to the user 310 moving her head to that look direction, the spatialized VPA audio engine 240 is configured to switch to a listen mode for a VPA command (e.g., "Tell me the weather today" or "Do we need milk at home?"). In some cases, while in this listen mode, the spatialized VPA audio engine 240 can provide the VPA audio response (e.g., "Today will be sunny, with a high of 75 degrees" or "Your refrigerator indicates that you have approximately ¼ gallon of milk left"), without receiving a wake word from the user 310. In these cases, the user 310 can seamlessly interact with the spatialized VPA audio engine 240 without requiring a wake command from the user (e.g., "Assistant" or similar wake command) or an additional initiation command, such as a touch command or gesture command. That is, the spatialized VPA audio engine 240 is placed into listen mode in response to only the change in the user's look direction to the predetermined look direction. In various implementations, in order to avoid falsely triggering listen mode, the user 310 must remain in the predetermined look direction for a threshold period (e.g., one or two seconds) before initiating the listen mode to recognize a voice command as a VPA command. In some cases, the threshold period can be user-configurable, e.g., to balance each user's tolerance for latency versus false triggering.

Figure 6:
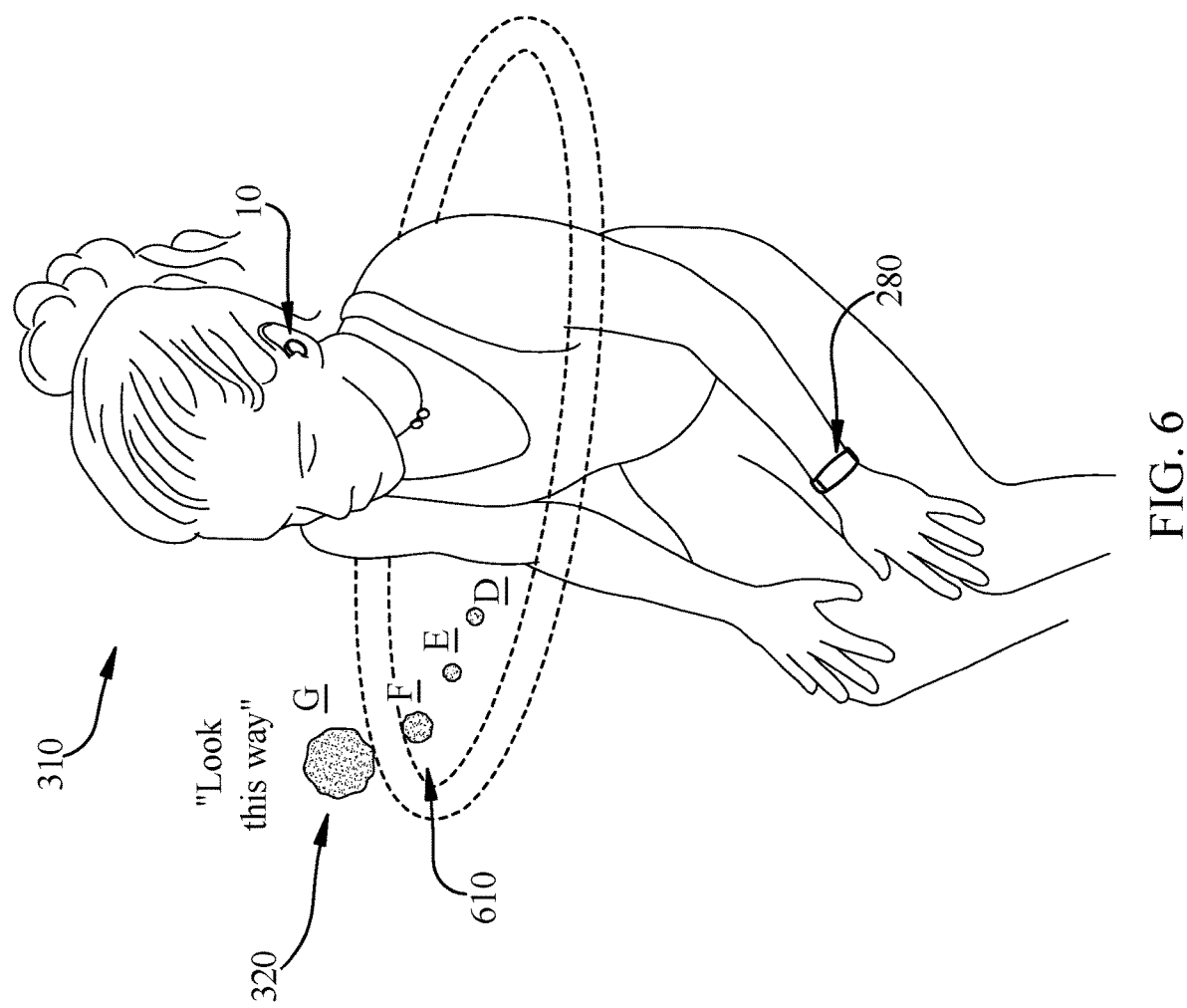
FIG. 6 shows a schematic depiction of an environment including a user interacting with the audio device of FIGS. 1 and 2, according to various implementations.

FIG. 6 illustrates another example implementation, where the spatialized VPA audio engine 240 is configured to output the VPA audio response 320 (e.g., "Look this way") as a path 610 of spatially rendered locations D, E, F, G to direct the attention of the user 310 along the direction of the path 610. In these cases, the VPA audio response 320 can be configured to move between the locations D, E, F, G by successively rendering audio at those locations to provide the sensation that the response is traveling within the audio space proximate the user. In particular cases, the spatialized VPA audio engine 240 can output the VPA audio response 320 as a path 610 in order to direct the user's attention to an attraction ("Look this way to see the Eiffel Tower") or direct navigation ("Turn to your right and walk 100 yards"). In additional cases, the VPA audio response 320 can be output as a path 610 based upon the audio content provided at the audio device 10, e.g., where an audio book or podcast depicts a vehicle traveling across the soundstage, or the content includes a "whisper" or low energy sound that could be played back closer to the ear.

Figure 7:
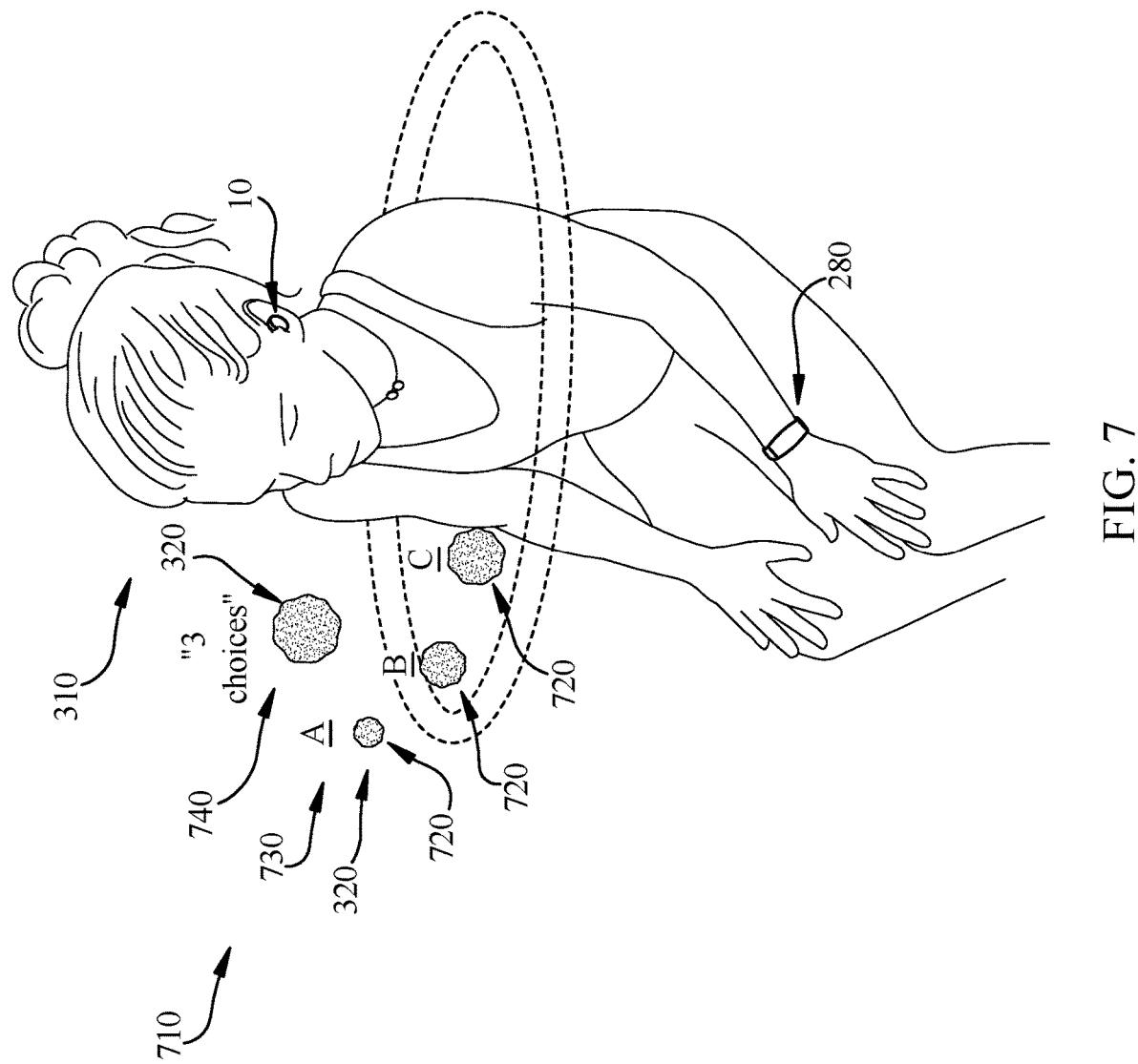
FIG. 7 shows a schematic depiction of an environment including a user interacting with the audio device of FIGS. 1 and 2, according to various additional implementations.

FIG. 7 illustrates another example implementation, where the spatialized VPA audio engine 240 provides the VPA audio response as a menu 710 of spatially delineated zones 720A,B,C in an array 730 that is defined relative to the user's look direction. In these examples, the user 310 can select between playback options in the array 730 of zones 720 using a voice command, gesture command or a tactile command. In some cases, the VPA audio response can additionally include a narrator response 740, which may be spatially rendered in a distinct location from (e.g., vertically above) the menu 710, and provide information about the menu 710 (e.g., "Here are three options for playback", or "Select between the following four movies based upon their audio trailers").

In some cases, the menu 710 can include a plurality of audio samples, information, or choices (to the user 310) corresponding with the spatially delineated zones 720 defined relative to the user's look direction, e.g., a physical position of the audio device 10 (e.g., a wearable audio device such as earphones, glasses, etc.). In the case of audio samples or information, each audio sample or piece of information provided to the user can be associated with a source of audio content 265 in the audio library 260 (FIG. 2). In the case of audio choices, each audio choice provided to the user can be associated with audio content 265 in the audio library 260 (FIG. 2). In some implementations, the samples of audio content 265 can include a selection of an audio file or stream, such as a representative segment of that audio content (e.g., the chorus of a song, the introduction to an audio book, a highlight from a sporting broadcast, a description of the audio content, an audio message, a description of an audio pin, an indicator of the presence of an audio pin, an audio beacon, a source of an audio message, or any other portion of the audio content 265). In various additional implementations, the sample of audio content 265 is the entire audio content (e.g., audio file), such as in the case of a message, audio cue, audio beacon, audio pin, request for feedback, etc. In some cases, sample settings can be saved in user profile(s) 275, or default sample settings can be utilized to determine which portion(s) of audio content 265 play as samples. In additional cases, a content provider can supply location-dependent samples, context-dependent samples, a text-to-speech application navigating a directory structure, or a mono and/or band-limited copy of content streams for playback as samples. In certain cases, where the sample is only a portion of the audio content 265, a looped representative sample can be provided as the sample(s) to enhance the likelihood that the user 310 recognizes the audio content 265, or louder portions of the audio content 265 can be provided as the sample(s) to improve audibility.

With continuing reference to FIG. 7, the array 730 is merely a visual representation of each of the zones 720 in which an audio sample, piece of information, or choice will play for the user 310. For example, based upon the physical position or look direction of the audio device 10 (e.g., as detected by the IMU or other sensor in sensor system 36), the spatialized VPA audio engine 240 can provide distinct audio samples to the user 310 (e.g., at the audio device 10 or at another device such as the audio gateway 210 or smart device 280) for playback. In some particular implementations, while in the spatialized VPA audio mode, the user 310 can move his/her body (e.g., head) between the spatially delineated zones 720, and spatialized VPA audio engine 240 will initiate playback of distinct audio samples, information, or choices corresponding with those zones 720. It is understood that these zones 720 are defined relative to a physical position of the audio device 10, such that each zone 320 can be associated with an orientation of the audio device 10 (e.g., a look direction). In the case of wearable audio devices, the user 310 may need only move his/her head a certain number of degrees from a first zone 720A to initiate playback of a distinct audio sample, piece of information, or choice corresponding with a distinct zone (e.g., zone 720B, 720C).

In certain implementations, as illustrated in the example environment in FIG. 7, the array 730 of zones 720 can include a one-dimensional array such as a linear array corresponding with user movement across one direction (e.g., head rotation). In various implementations, the number of zones 720 in the array 730 can be determined based upon the type of audio device 10 (or other device) used to perform audio selection. For example, where the spatialized VPA audio engine 240 detects that the audio device 10 (or other selection device) is a head, neck or body-mounted audio device 10, the number of zones 720 in the array 730 can be limited to a degree of movement corresponding with that body part. In the case of a head-mounted audio device 10 such as a pair of smart glasses or headphones, the span of the array 330 can be limited, e.g., to less than 90 degrees, 120 degrees or another range. In particular examples, the span of array 730 can be limited to approximately 45-75 degrees from the edge of its left-most zone 720A to the edge of its right-most zone 720A+X, and in particular cases, can span approximately 50-60 degrees. In additional implementations, the span of array 730 can be modified based upon a current position of the user 310, e.g., whether user is sitting versus standing. In certain cases, the span of array 330 can be larger for a user determined to be standing (e.g., via one or more inputs from sensor system 36 such as relative distance from a floor/ceiling, rate of movement, etc.) than for a user determined to be sitting (e.g., via relative distance from floor/ceiling, lack of significant movement, etc.).

It is additionally understood that the span of array 730 can be further limited by a desired number of zone selections, based upon preferences of the user 310 or default settings. For example, each zone 720 can span a certain number of degrees across a user's field of motion, so as to clearly present distinct audio sample options to the user 310. While the user 310 may be comfortably capable of up to 150 degrees of motion in a particular direction (e.g., head rotation), the user experience may be enhanced with a smaller range of motion, e.g., 50-60 degrees. Additionally, while any number of audio samples, corresponding with zones 720, can be presented across this range of motion, the range of each zone 720 can be set to a degree measurement providing for sufficient sampling as the user 310 moves between zones 720, e.g., 10-15 degrees per zone 720. In particular examples, the user 310 is presented with approximately 4-6 zones 720 or less, spanning approximately 45-75 degrees (with each zone 720 spanning approximately 10-15 degrees).

It is further understood that in other implementations, the zones 720 can be arranged in an array that has multiple dimensions, e.g., a vertical and horizontal axis. This can allow the user 310 to initiate playback of audio samples in zones 720 along a first dimension and a second dimension. For example, the environment depicted in FIG. 7 can additionally include vertically aligned zones 720 in addition to the array 730 shown. In these cases, a set of zones 720 could be added to the array 730 spanning in the vertical direction such that user 310 can tilt his/her head upward or downward to initiate playback of the audio corresponding with zones 720 aligned along the vertical dimension relative to one or more zones 720 in array 730.

In additional implementations, the user 310 (e.g., via settings in profile(s) 275 or other actuation with spatialized VPA audio engine 240), or settings in spatialized VPA audio engine 240, can configure the layout of zones 720 in the array 730. For example, in response to initiating the spatialized VPA audio mode, spatialized VPA audio engine 240 can present a first array 730 of zones 720 to the user 310 when user 310 is looking straight ahead (e.g., a neutral or rest position), a second (distinct) array 730 of zones 720 when the user 310 looks down, and a third (additionally distinct) array 730 of zones 720 when the user 310 looks up. In particular example implementations, a first category of selection(s) is presented in the neutral or rest position (e.g., selections of radio stations for streaming), a second category of selection(s) is presented when the user 310 looks up (e.g., weather information for a city or region) and a third category of selection(s) is presented when the user 310 looks down (e.g., calendar or meeting information).

In various implementations, where the VPA audio response 320 includes audio samples corresponding with zones in an array (e.g., zones 720 in array 730), the VPA audio response 320 is based upon at least one preset associated with the user 310. For example, the user 310 may have profile settings (in profile 275, FIG. 2) with preset sources of audio content 265, such as a set of Internet radio stations, sports talk radio channels or audio books. The spatialized VPA audio engine 240 can use that profile 275 (and in some cases, other data such as location and/or environmental data from sensor system 36 and/or smart device 280), to select a set of sources of audio content 265 for sample playback at the zones 720. These presets can be arranged in any manner described herein, such as alphabetically, numerically, with/without priority, etc. In any case, the characteristic(s) of the source of audio content 265 can be used to select and/or arrange zones 720 in the array 730.

As noted herein, selection of the VPA audio responses 320 in an array (e.g., array 730) can be based upon the location of audio device 10. For example, the spatialized VPA audio engine 240 can use location data (e.g., from sensor system 36, smart device 280 and/or audio gateway 210) to determine a location of the audio device 10. Using that location data, the spatialized VPA audio engine 240 can select audio samples for playback (e.g., at the audio device 10, smart device 280 and/or audio gateway 210) to the user 310. In some examples, when a user 310 initiates the spatialized VPA audio mode in a location where that user 310 has previously initiated the spatialized VPA audio mode (e.g., as indicated by location sensors and/or the IMU in sensor system 36, smart device 280 and/or audio gateway 210), the spatialized VPA audio engine 240 can provide the same set of audio samples previously available at that location. In other examples, a user 310 may have particular settings (e.g., in profile(s) 275 or default settings) dictating that particular audio content 265 or types of audio content 265 can be provided for selection at particular locations (or location types). In these cases, spatialized VPA audio engine 240 can receive location information (e.g., from sensor system 36) and provide a location-specific selection of audio samples based upon that location information. A user 310 can have location-specific settings dictating sources of audio content 265 for home (e.g., a selection of relaxing playlists or stations), work (e.g., a selection of classical music playlists or stations), commute (e.g., a selection of audio books or podcasts), gym (e.g., a selection of up-tempo playlists or stations), etc. The spatialized VPA audio engine 240 can receive the location information indicating a location of the audio device 10, and filter the sources of audio content 265 according to settings (e.g., user profile(s) 275) for that location.

In some cases, each of the VPA audio responses 320 provided to the user 310 as she moves between zones in the array (e.g., zones 720 in the array 730, FIG. 7) includes an audio prompt or message including a descriptor of the content in each of those audio samples. For example, as user 310 initiates the spatialized VPA audio mode, the spatialized VPA audio engine 240 can provide (e.g., render) an audio prompt overlayed with an audio sample or audio feed. In some cases, the audio prompt and the audio feed are separate audio streams. However, in various implementations, the audio prompt and the audio feed can be combined in a single audio file. The audio prompt can include identification information or any descriptor of the content in each sample, such as, "Now playing: 'Dirty Water' by the Standells," or simply, "'Dirty Water' by the Standells." The audio prompt can further include a request for feedback, such as a request that user 310 actuate one or more actuation mechanisms (e.g., tactile, verbal, gestural) to like, dislike or otherwise judge the audio sample. In these examples, the audio prompt could say, "Shake your head to dislike; nod your head to like," or "Nod your head if you like this sample." The spatialized VPA audio engine 240 can use its feedback logic to update its query and selection processes (e.g., in logic 250) based upon the feedback from user 310.

In some implementations, with reference to FIG. 2, spatialized VPA audio engine 240 is further configured to initiate playback of a source of audio content 265 associated with a selected audio sample, piece of information, or choice made by the user in response to the VPA audio response. That is, after receiving the selection command (e.g., from audio device 10, audio gateway 210 and/or smart device 280) in response to the VPA audio response, the spatialized VPA audio engine 240 is configured to initiate playback from the audio content source, e.g., of a complete audio file or audio stream associated with the audio sample, piece of information, or choice. In some cases, playback of the source of audio content 265 can continue fluidly from the audio sample which the user 310 selected from the menu 710 (FIG. 7), or can revert to another portion of the audio content 265, e.g., the beginning of a song or the introduction to an audio book. In certain implementations, after selection of audio content 265 for playback, audio content 265 from other streams (e.g., other zones 720, FIG. 7) is no longer rendered. That is, after selection of one of the zones 720 for playback of associated audio content 265, user 310 must re-initiate the spatialized VPA audio mode to select a different stream of audio content 265.

While spatialized VPA audio engine 240 can have useful applications in terms of playback of music, Internet radio, podcasts, audio books or other program-style content, the spatialized VPA audio engine 240 can have various additional applications. For example, with continuing reference to FIGS. 2 and 7, spatialized VPA audio engine 240 can be configured to provide any audibly presentable material to the user 310 in the form of distinct playback zones. In particular examples, spatialized VPA audio engine 240 can be useful in commercial applications such as online shopping. In these cases, the user 310 can initiate the spatial audio mode of spatialized VPA audio engine 240 to provide a plurality of shopping options associated with zones 320. Each audio sample can include a listing of goods or services for purchase, such as an order of goods or services commonly purchased by the user 310. The spatialized VPA audio engine 240 can utilize user profile(s) 275, e.g., from linked shopping accounts such as those provided by online or brick-and-mortar retailers to select frequently ordered items associated with the user 310. In additional implementations, the spatialized VPA audio engine 240 can obtain profile(s) 275 from other linked devices, e.g., in the user's home, office, etc. to determine which products or services may be desirable. For example, the profile(s) 275 can include information from smart home appliances about the need for maintenance or supplemental parts (e.g., light bulbs or coffee filters). In a particular example, after initiating the spatial audio mode, the user 310 is presented with audio samples including product jingles, voice overlay(s), and/or vocal descriptions of products for purchase/re-purchase. One set of samples associated with zones 320 can include:

Zone 720A: "Re-order one gallon of Brand X milk"
Zone 720B: "Re-order Store Brand paper towels"
Zone 720C: "Order light bulbs for lamp from Store Z."

As described herein, the user 310 can make a selection command, e.g., via audio device 10, and initiate the order associated with the selected zone 320.

Figure 8:
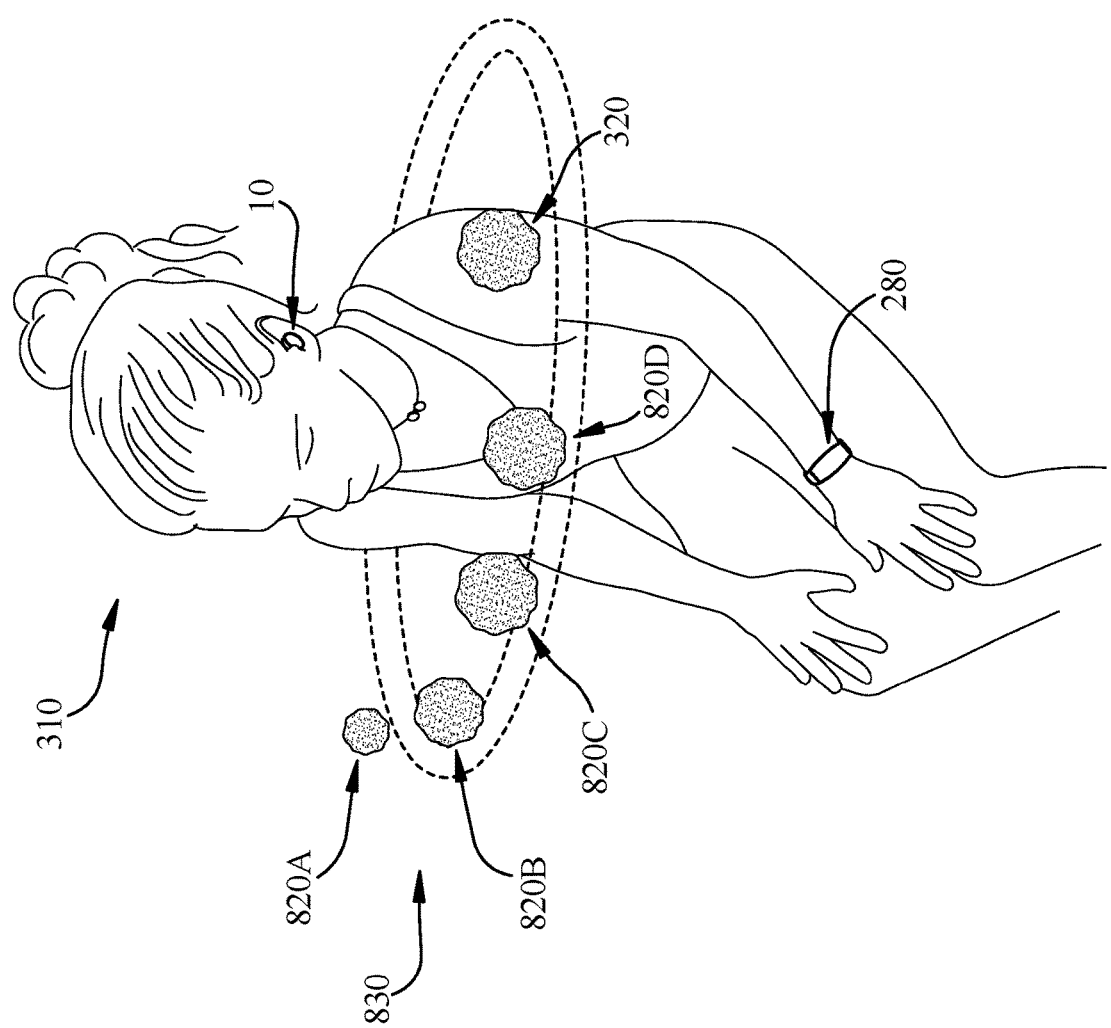
FIG. 8 shows a schematic depiction of an environment including a user interacting with the audio device of FIGS. 1 and 2, according to further implementations.

FIG. 8 presents an additional example implementation, where the VPA audio response 320 is presented along with spatially delineated zones 820 in an array 830 of audio source options. This array 830 can take the form of any array of zones described herein, e.g., similarly to the array 730 of zones 720 described with reference to FIG. 7. However, in the implementations depicted in FIG. 8, the VPA audio response 320 is presented as one of the options (zones) in the array 830. In a particular implementation, at least one of the remaining zones 820A,B,C,D includes a phone call source, and in additional implementations, all of the remaining zones 820A,B,C,D include distinct phone call sources (e.g., in a conference call scenario). In this example, the VPA audio response 320 can be spatially rendered in a physical location that is separated from the spatially rendered physical location of the phone call sources in the remaining zones 820, such that the user 310 can make VPA commands while looking in the direction of the zone where the VPA audio response 320 is located and/or receive VPA audio response playback at that zone. In some cases, the configuration of the array 830 is useful for conference call applications, where the user 310 is able to hear incoming audio from all of the distinct caller sources in the zones 820 in real time, and can direct her response (e.g., voice or text response) to that incoming audio by changing her head direction to focus on one of those callers at a time. The user 310 can also make VPA commands by adjusting her look direction toward the VPA audio response zone and actuating any command function described herein, e.g., a voice command, tactile command, or gesture command. In particular cases, the spatialized VPA audio engine 240 is configured to pause playback from one or more other sources in the array 830 while the user 310 makes a VPA command (or while the user 310 is looking in the look direction of the VPA response zone). In other particular cases, the spatialized VPA audio engine 240 is configured to mute the user 310 on the call(s) with the other phone call sources while the user is making the VPA command or looking in the look direction of the VPA response zone.

Figure 9:
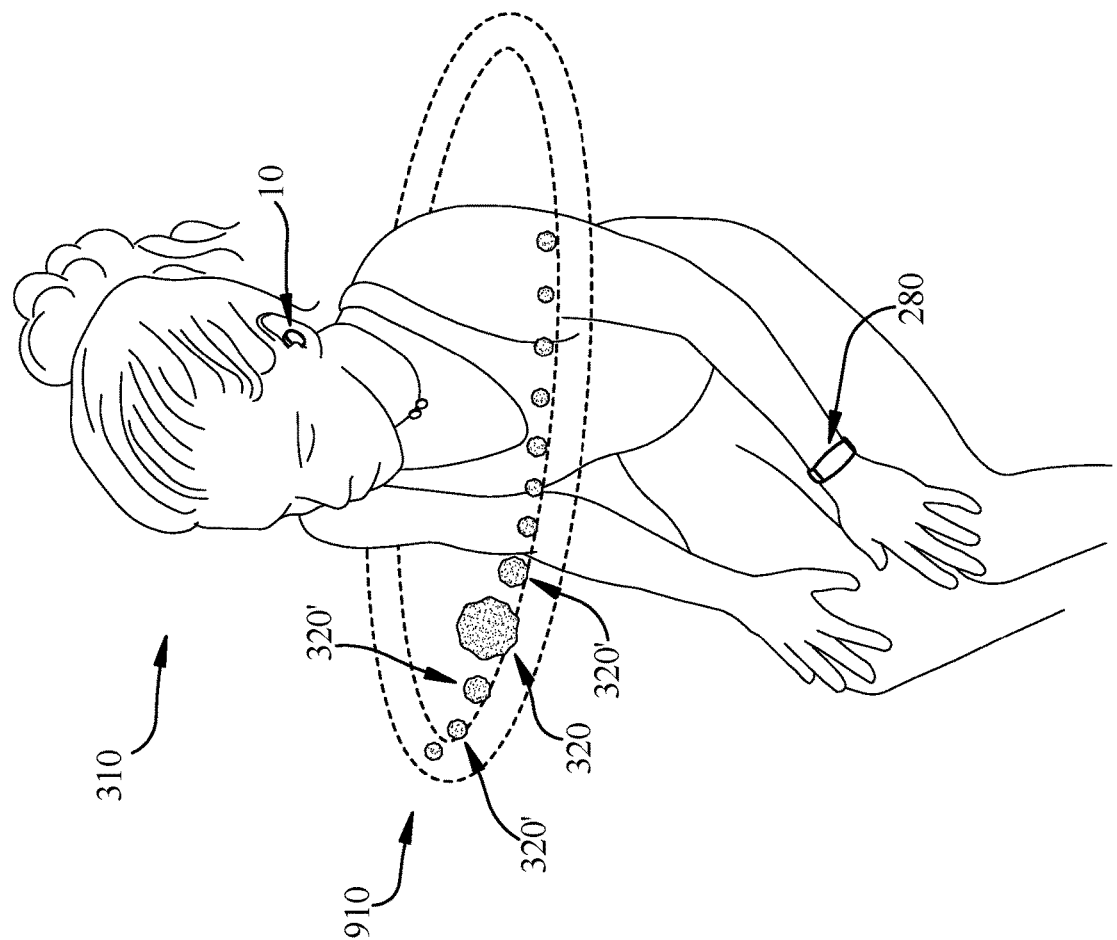
FIG. 9 shows a schematic depiction of an environment including a user interacting with the audio device of FIGS. 1 and 2, according to various implementations.

FIG. 9 illustrates another implementation, where the user 310 can use head gestures to select amongst VPA audio response options in a listing, timeline or other sequential arrangement 910. In these cases, the user 310 is presented with only one VPA audio response 320 at a time (e.g., at a designated spatially rendered audio location), but can change the VPA audio response 320 and/or make a selection using one or more gestures. VPA audio responses 320 that are not currently being played back are differentiated in size from the primary VPA audio response and are indicated with the notation 320'. In some cases, the VPA audio response 320 is presented in a location approximately in front of the user 310, e.g., to allow the user 310 to comfortably make a range of gesture commands. For example, the user 310 can activate the spatialized VPA audio mode by any mechanism described herein, e.g., a voice command, gesture command, tactile command, etc., and the VPA response 320 can be presented in a selectable listing format, as illustrated in FIG. 9. The user 310 hears the default VPA audio response 320, or a narration response (e.g., "Please select between options by nodding, looking left-to-right, waving with your hand or saying 'Next'"), and can move through the menu of VPA audio response options using a gesture command (e.g., waving a hand or looking left/right), a tactile command (e.g., tapping a capacitive touch interface on the audio device 10) or a voice command (e.g., "Next"). When the user 310 finds a desired VPA response, she can gesture (e.g., nod), provide a voice command (e.g., "Yes" or "Select") or provide a tactile command (e.g., double-tap on capacitive touch interface) to select that VPA audio response. This listing arrangement or menu can have various applications, for example, the user 310 can select items for a shopping list, preview audio content for playback (e.g., music channels or audio books), select between travel or entertainment options (e.g., audio listings from hotels, restaurants, or concert venues), adjust playback volume, select between playback options (e.g., music playback), perform scalar audio adjustments on the audio device 10, etc.

Figure 10:
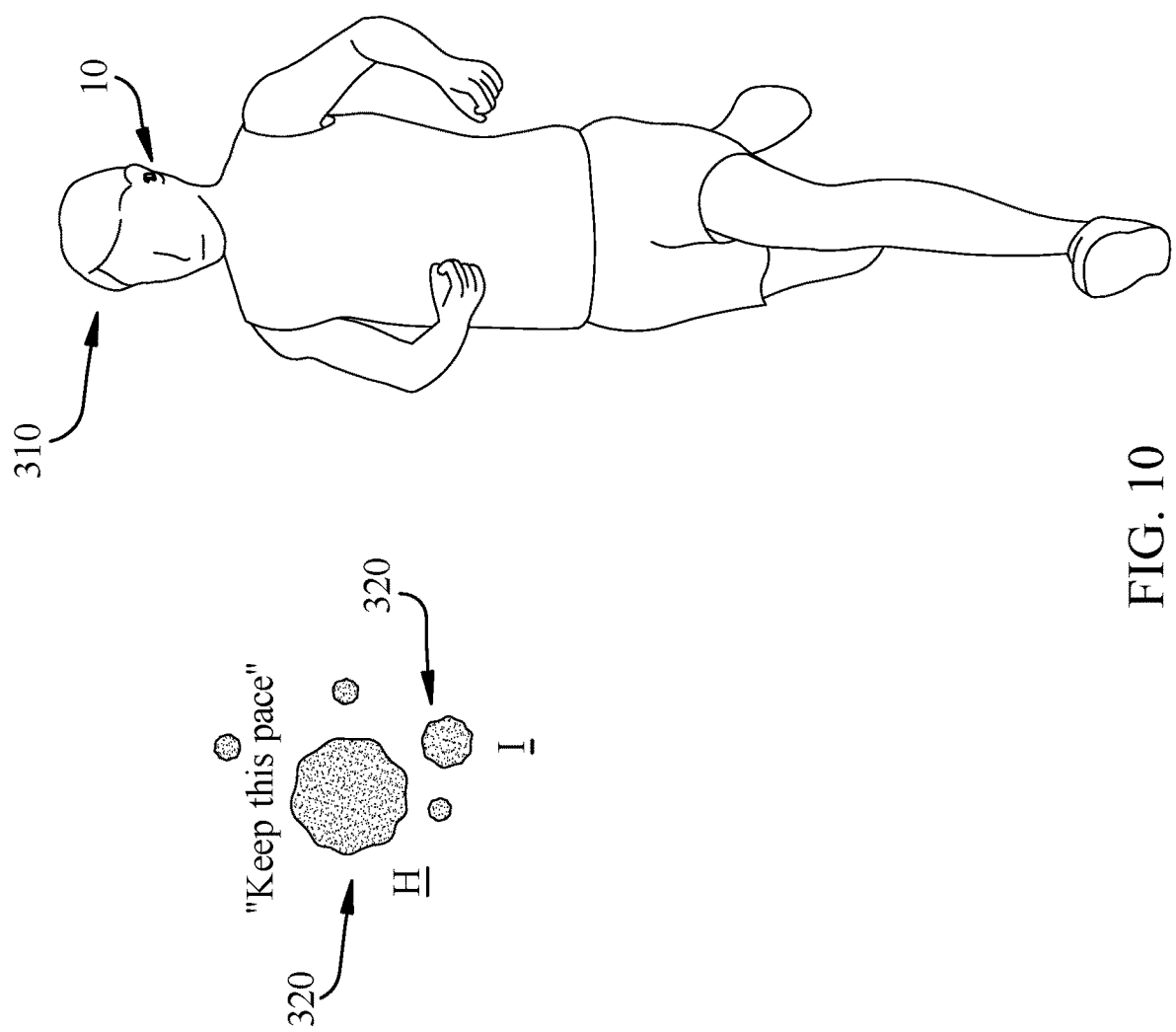
FIG. 10 shows a schematic depiction of an environment including a user interacting with the audio device of FIGS. 1 and 2, according to various additional implementations.

FIG. 10 shows an additional implementation where a VPA audio response 320 includes a virtual coach, such that the spatially rendered audio location (e.g., location H) is placed at a distance relative to the user 310. In these cases, the spatially rendered audio location (H) of the VPA audio response 320 can appear to be at least several feet in front of the user 310, e.g., up to 5-10 feet in the distance, and approximately directly in front of the user 310. In these example implementations, the VPA audio response 320 includes playback of audio content encouraging the user 310 to move toward the spatially rendered audio location H. The audio content can include voice playback of a coach or other person such as a family member, friend, celebrity, famous athlete, etc., and can include encouraging phrases such as "Keep moving forward", "Only X more miles to go", etc. In some cases, the audio content can reference a milestone that the user 310 is attempting to achieve (e.g., "You are 500 steps from the top of the mountain", "Only 300 steps left before you reach your daily goal"). The spatialized VPA audio engine 240 can also be configured to provide two VPA audio responses 320, either both in front of the user 310 (e.g., with different voices, or different content) or one in front of the user and one proximate the user's ear (e.g., appearing to come from a physical location over the user's shoulder). An example of an additional VPA audio response 320 is shown at location I. These VPA audio responses 320 can work in concert to coach the user 310 toward a goal, for example, with the VPA audio response at the front of the user 310 playing back louder than the VPA audio response at the user's shoulder. In some particular cases, as noted herein, the VPA audio response location is defined relative to a physical location proximate the user, e.g., at magnetic north, in the direction of a landmark, or in the direction in which the user is moving.

In further implementations, the spatialized VPA audio engine 240 is configured to direct the user to look in a particular direction and take corresponding action. For example, in some examples, the VPA audio engine 240 is configured to output the VPA audio response 320 in a spatially rendered audio location defined relative to a physical location proximate the user, to direct the user's attention in a look direction that is distinct from the user's current look direction (e.g., as detected by the IMU or other sensor(s) in the sensor system 36). In these cases, the VPA audio response 320 can include an introductory phrase, clause, tone, or any other response described herein (e.g., "Look over here" or "This way"). In response to detecting that the user adjusts her look direction to correspond with the look direction location of the VPA audio response 320 (e.g., within a margin of error or a range such as 5-15 degrees of motion), the VPA audio engine 240 is further configured to output an additional VPA audio response 320 corresponding with the user's adjusted look direction. This additional VPA audio response 320 can be part of the same audio content 265 (e.g., audio file or stream) as the initial VPA audio response 320, or may be a distinct audio file or stream. The additional VPA audio response 320 can include information that is relevant to the look direction, e.g., a description of a location of interest ("In this direction you will see Boston Harbor") or an indicator of direction ("Head three blocks in this direction to reach Faneuil Hall").

In some additional implementations, the VPA audio response 320 includes a single file or stream, and the VPA audio engine 240 is configured to delay or pause playback of a portion of the VPA audio response 320 until detecting that the user's look direction corresponds with the look direction location of the VPA audio response 320 (e.g., within a margin of error or a range). In these cases, the VPA audio engine 240 can provide a portion of the VPA audio response 320 (e.g., an introduction portion such as: "In this direction . . . ", "To your left . . . ", "When you look this way you will see . . . "), and pause or delay playback of the remainder of the VPA audio response 320 until receiving sensor data indicating that the user has adjusted her look direction to correspond with the look direction location of the VPA audio response 320. The remainder of the VPA audio response 320 can include a continuation of the first portion of the VPA audio response 320, e.g., (" . . . is a farmer's market that is open for the next hour", " . . . you will find the childhood home of Paul Revere", " . . . a T station with service to your neighborhood").

In additional implementations, the spatialized VPA audio engine 240 is configured to analyze a series of voice commands from the user 310 to control spatialized VPA audio functions in the audio device 10. For example, in some cases, the user 310 can provide a VPA command as a series of voice commands at varying look direction positions. In such a case, the user 310 may look left and say, "Assistant, what is the weather forecast for the weekend?", and then look right and say, "What is the earliest I can get a reservation at The Steakhouse for dinner tonight?"), etc. The spatialized VPA audio engine 240 is configured to update the spatially rendered audio location of the VPA audio response (e.g., between locations A-X, depicted in FIGS. 2-10) based upon natural language cues in that series of voice commands, along with the corresponding look direction positions. For example, the spatialized VPA audio engine 240 (including logic 25) can include a parsing engine for parsing voice commands, e.g., to classify domains within a voice recognition database. The spatialized VPA audio engine 240 can also include a semantic parser for analyzing the parsed language in the voice commands, and taking action after identifying commands associated with that parsed language. In various implementations, the spatialized VPA audio engine 240 can include the logic for performing these functions, or can communicate with a cloud-based voice command analysis engine to perform the voice command analysis functions.

In still further implementations, where the spatialized VPA audio mode includes two VPA audio responses 320 (e.g., a front and side, or left and right VPA audio response), the spatialized VPA audio engine 240 can be configured to provide distinct VPA audio responses 320 to the same user voice command based upon the location of the VPA audio response 320 and the user's look direction. That is, the spatialized VPA audio engine 240 can be configured to provide a first VPA audio response 320 (in a first spatialized audio location) to a user voice command while the user is in a first look direction, and is also configured to provide a second VPA audio response 320 (in a second spatialized audio location) to the same user voice command while the user is in a second look direction. In this example, the user can provide a voice command such as, "What am I looking at?" or "Tell me in which direction I am looking", and the spatialized VPA audio engine 240 is configured to provide a distinct VPA audio response 320 to each of those commands based upon the user's look direction and the location of the spatialized VPA audio response.

In still other implementations, the spatialized VPA audio engine 240 is configured to cancel, remove or mask an identified noise in the surrounding environment. For example, a user wearing the audio device 10 in an airplane may hear a baby crying over her left shoulder, and choose to cancel, remove or mask that particular noise. In some cases, the user can identify that noise source, for example, by looking in the direction of the noise and making a cancellation command. The cancellation command can include any command described herein, e.g., a voice command ("Cancel nose", or "Mask noise source"), a textile command (e.g., double-tap on an interface at the audio device 10, or selection of a "noise cancel" button on a UI), or a gesture command (e.g., head shake). The cancellation command can also be made using an application, e.g., run at audio gateway 210 that can provide detail about the noise being canceled, removed or masked (e.g., "cancel baby crying" button). The spatialized VPA audio engine 240 can also confirm that the correct noise is being addressed (e.g., cancelled, removed or adjusted). In these cases, in response to the user command to address the noise, the spatialized VPA audio engine 240 can provide the VPA audio response 320 in a direction corresponding with the direction of the noise relative to the user's look direction (e.g., "Would you like to cancel this noise?", or "This noise?", rendered behind the user and to the left). The user can respond to this question in the VPA audio response 320, for example, with a subsequent command to identify a different noise source (e.g., "no", or a gesture command looking in a different direction) or with a confirmation command (e.g., "yes" or a nodding gesture). This spatialized noise cancellation approach can be useful in various scenarios, for example, where the user is in an office and wishes to cancel/remove/mask construction noise from the street, or where the user is in a café and wishes to cancel/remove/mask conversational noise from a neighboring table.

While conference call and other phone call-related implementations are described herein (e.g., with respect to FIGS. 7 and 8), in certain implementations, the VPA audio response 320 can be rendered as background audio shared between the user 310 and an additional user on a phone call. For example, the VPA audio response 320 can include music, audio playback of a recording such as a speech or a talk given at a conference, etc., and the user 310 can play back the VPA audio response 320 at both the audio device 10 (as described herein), as well as transmit that VPA audio response to the user on the other end of the phone call.

According to various implementations, and as further described herein, the spatialized VPA audio engine 240 is configured to compare the spatially rendered audio location of the VPA audio response 320 with data indicating the look direction of the user 310 (e.g., data gathered from the sensor system 36, such as the IMU, camera, etc.). This comparison can be performed on a continuous or periodic basis. In response to detecting a change in the look direction of the user 310 (e.g., with data from sensor system 36), the spatialized VPA audio engine 240 is configured to update the spatially rendered audio location of the VPA audio response 320.

In some particular cases, the spatially rendered audio location of the VPA audio response is calculated using a head related transfer function (HRTF). One example technique for spatializing audio is described in U.S. patent application Ser. No. 15/945,449, filed Apr. 4, 2018, titled "Systems and Methods for Sound Externalization Over Headphones", which is incorporated herein by reference in its entirety.

Additionally, in various implementations, the VPA audio response 320 comprises at least one of a prerecorded binaural audio response to the VPA command or a spatially rendered text-to-speech (TTS) response to the VPA command.

While example implementations described herein relate to head tracking between zones in an array, with particular emphasis on look direction, it is understood that additional alternative implementations can employ eye tracking (e.g., via an eye tracker in sensor system 36) to permit selection of look directions (or corresponding zones) via eye movement. In these cases, the user 310 can move his/her eyes between spatially delineated look directions (which may be calibrated for eye-tracking actuation), and spatialized VPA audio engine 240 will update the location of the VPA audio response 320 as described herein.

Returning to FIG. 2, in some cases, user settings (e.g., settings in user profile(s) 275) or default settings can be used by logic 250 to control functions based upon feedback from the user 310. For example, user settings can indicate that negative feedback should trigger a halt (stop) of the spatialized VPA audio mode, or revert back to a prior audio output (e.g., audio output prior to initializing spatialized VPA audio mode). In additional implementations, feedback can be solicited at a later time, e.g., via a mobile application or message at audio gateway 210 and/or smart device 280 in order to train feedback. In some cases, the user 310 can exit the spatialized VPA audio mode with a gesture, voice command or tactile command, which may differ from the type and/or sub-type of command used to initiate the spatialized VPA audio mode. Additionally, a timeout mechanism can close the spatialized VPA audio mode if a selection is not made within a prescribed period.

In various implementations, logic 250 includes sensor data processing logic configured to process sensor data from sensor system 36 as well as any other sensors described with respect to audio gateway 210 and/or smart device 280, and provide a weighted localized representation to audio library lookup logic to enable fetching a type of audio content 265 for providing in the audio samples. That is, sensor data processing logic can include weightings or factoring for one or more of user preferences (e.g., user profile(s) 275), sensor data about past events (e.g., position and/or acceleration information about audio device 10 over given periods), audio files (e.g., audio samples of user's voices, or audio signatures such as ambient audio signatures, as sampled by microphone(s) in sensor system 36 or other devices), and other readily available data (e.g., a demographic profile of a plurality of users with at least one common attribute with the user 310, or a categorical popularity of audio content 265). The weighted localized representation may indicate a general characteristic of the location of user 310, etc., as a combination of factors from sensor data, profile(s) 275 and/or information from smart device 280. In particular examples, the weighted localized representation can be determined using at least one of a geofence, a local area network, a Bluetooth network, a cellular network, or a global positioning system (GPS), though other techniques may be used.

After processing sensor data with logic 250, additional audio library lookup logic can search audio library 260 for audio content 265 using the weighted localized representation from the sensor data processing logic. Library lookup logic may include a relational database with relationships between the weighted localized representation and audio content 265. As noted herein, audio library 260 can be locally stored at personal audio system 10, audio gateway 210, smart device 280, and/or stored at one or more remote or cloud-based servers. Library lookup logic can be continually updated based upon changes in audio library 260 in order to provide accurate, timely associations between the weighted localized representation from the sensor data processing logic and audio content 265. The library lookup logic can utilize the weighted localized representation to determine which audio samples should be provided to the user 310 according to the user profile 275 and/or proximity to a geographic location.

In some example implementations, spatialized VPA audio engine 240 (e.g., using logic 250 including sensor data processing logic and/or library lookup logic) is configured to perform one or more of the following logic processes using data from sensor system 36 and/or other data accessible via profile system 270, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, spatialized VPA audio engine 240 is configured to work in concert with sensor system 36 to continually monitor changes in one or more environmental conditions. In some cases, sensor system 36 may be set in an active mode, such as where a position tracking system such as the IMU pings nearby Wi-Fi networks to triangulate location of the audio device 10, or microphone(s) 18 and/or 24 (FIG. 1) remain in a "listen" mode for particular ambient sounds. In other implementations, sensor system 36 and spatialized VPA audio engine 240 can be configured in a passive mode, such as where the network interface 34 at audio device 10 detects signals transmitted from nearby transceiver devices or network devices. In still other implementations, distinct sensors in the sensor system 36 can be set in distinct modes for detecting changes in environmental conditions and transmitting updated sensor data to spatialized VPA audio engine 240. For example, some sensors in sensor system 36 can remain in an active mode while audio device 10 is active (e.g., powered on), while other sensors may remain in a passive mode for triggering by an event.

It is further understood that other devices such as audio gateway 210 and/or smart device 280 can receive selection commands and initiate functions by the spatialized VPA audio engine 240 based upon those selection commands. For example, the user 310 can actuate a selection command at the smart device 280, e.g., where smart device 280 includes a smart phone or wearable smart device such as a smart watch, with gesture detection (e.g., gyroscope/accelerometer/magnetometer), voice detection (e.g., with one or more microphones) and/or a user interface permitting actuation by the user. In other cases, the audio gateway 210 can include a smart phone or smart speaker with at least one of the above-noted detection or user interface functions. For example, the audio gateway 210 can include a smart speaker with voice detection and/or a user interface permitting actuation by user 310.

According to various implementations, playback of the source of audio content 265 can be provided from any of the connected devices in system 200. In certain implementations, playback can be coordinated across multiple devices, e.g., the audio device 10, audio gateway 210 and/or smart device 280. For example, position information from sensors 36 can be obtained from audio device 10 and used to adjust playback at devices as the user (and audio device 10) moves relative to the audio gateway 210 and/or smart device 280.

In still further implementations, the spatialized VPA audio engine 240 is configured to enhance virtual reality (VR) and/or augmented reality (AR) experiences, for example, by providing audio content 265 associated with one or more objects visible to a user (e.g., user 310) in a VR or AR environment. For example, where audio device 10 includes a wearable audio device such as smart glasses, or a VR and/or AR headset, spatialized VPA audio engine 240 can obtain data from the sensor system 36 about the virtual/augmented environment experienced by the user 310, and provide relevant VPA audio responses 320 for selection based upon that VR/AR environment. For example, where a user 310 is looking at distinct items in a virtual store (or augmented physical store) and provides a VPA command, the spatialized VPA audio engine 240 can provide VPA audio responses 320 including audio playback of descriptions of those items.

In some cases, the spatialized VPA audio engine 240 can convey multiple layers of information in the VR/AR environment. For example, audio content 265 can be provided to user 310 as layered information, such that initial audio content 265 (e.g., identification information) is provided when user 310 initially interacts with an object in the VR/AR environment and provides a VPA command. Additional VPA commands (e.g., voice commands) can unwrap additional information about the object. For example, user 310 can interact with the object in the VR/AR environment, e.g., by looking at the object, and making a VPA command (e.g., "Assistant, what is this item?"). Spatialized VPA audio engine 240 can provide identification information about that object (e.g., "These are headphones from company X") when the user 310 looks in that object's direction (e.g., using zones or other spatial indicators described herein) and makes this VPA command. User 310 can provide an additional VPA command (e.g., an additional voice command such as "What does it cost?") to get additional information about the object (e.g., "Company X's patented noise cancelling headphones cost $300."). An additional VPA command from user 310 (e.g., "Are they popular?") can provide further VPA audio responses, such as a reviews from other user(s) or trusted sources (e.g., "Amy says: 'These are the best headphones I have ever purchased.'"). These additional layers of information can be contextually and/or preferentially configured, e.g., according to settings in user profile(s) 275, such that information is provided from trusted and/or preferred sources. Additionally, these VPA audio responses 320 can be spatially rendered in locations according to various parameters described herein.

With continuing reference to FIG. 2, in additional implementations, the microphone(s) in sensor system 36, audio gateway 210 and/or smart device 280 can be utilized to detect ambient acoustic signals proximate the audio device 10. The spatialized VPA audio engine 240 can be configured to modify playback of the audio content 265 (and/or samples of sources of audio content 265) at the audio device 10 based upon that ambient acoustic signal. For example, the spatialized VPA audio engine 240 can be configured, based upon default settings, user-defined settings, message-provider preferences, etc., to modify the audio playback in the spatialized VPA audio mode according to the ambient acoustic signal received at sensor system 36 (e.g., microphone(s) 18 and/or 24).

In various implementations, the spatialized VPA audio engine 240 can solicit feedback about the spatial audio mode via a feedback prompt, such as an audio prompt. For example, a feedback prompt can include a phrase such as "Did you enjoy this virtual personal assistant experience?", or "Would you like to continue interacting with this virtual personal assistant?" Additionally, in some cases, the audio prompt can include one or more tones. Feedback prompt can include any spoken phrase, word or clause intended to elicit a response from user 310, or can include a displayed prompt (e.g., similar to audio phrase, or with a Yes/No/Maybe or other visual prompt with touch-screen or push-button response capabilities), such as a prompt displayed at audio gateway 210 and/or smart device 280 or other device within range of user 310. In various implementations, a feedback prompt can be provided to the user 310 without an intervening audio input from user 310, such that user 310 is not required to prompt spatialized VPA audio engine 240 (e.g., by using an initiation term such as a name) in order to provide feedback. That is, in the case of eliciting verbal feedback the control circuit 30 can maintain the microphone(s) in sensor system 36 in a query mode during playback of the VPA audio response 320 (e.g., audio content 265, such that the system actively awaits a response from the user 310. In some implementations, microphone(s) can remain in an optional response mode while providing the VPA audio response 320 and/or feedback prompt. That is, control circuit 30 can maintain microphone(s) in a listen mode for a set period, with an expectation that user 310 may or may not respond (e.g., with a "Thanks," compliment or other feedback about the VPA audio response 320 and/or feedback prompt). Additionally, other sensors in sensor system 36, such as the IMU, can be configured to remain in a query mode and/or optional response mode for a prescribed period in order to receive feedback from user 310.

In some cases, feedback from user 310 is processed by logic 250, e.g., feedback logic in order to improve functions of spatialized VPA audio engine 240. In some cases, where feedback inputs include an audio signal, the feedback logic may analyze those inputs using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, the VPA audio response 320 (e.g., FIG. 3) can include "text" metadata, which can allow spatialized VPA audio engine 240 to perform metadata feature extraction on those files (or streams) of content. This metadata feature extraction can include, for example, matching and linking features to a database (e.g., audio library 260) and/or retrieving/analyzing additional audio and semantic attributes of the VPA audio response 320, e.g., in the case of music: genre, mood, themes or related artists. Spatialized VPA audio engine 240 (and logic 250 therein) can use the acoustic, gestural or other feedback from user 310, and metadata features from VPA audio response 320, to perform statistical and probabilistic modeling in order to recommend or select other future VPA audio responses 320 and/or recommend VPA audio responses 320 (e.g., radio stations, albums, playlists or artists) in accordance with other functions.

In some cases, feedback logic can be configured to teach sensor data processing logic and/or library lookup logic about preferences of the user, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic can be configured to analyze feedback and enhance future operations of spatialized VPA audio engine 240. It is further understood that logic 250, including feedback logic, library lookup logic and/or sensor data processing logic may be interconnected in such a manner that these components act in concert or in reliance upon one another.

In some cases, the spatialized VPA audio engine 240 can be utilized with a mobile application, such as an application accessible on the audio device 10 or the smart device 280, and can provide an actuatable mechanism (e.g., an interface control, audio control or tactile control) for saving or modifying settings and preferences. The mobile application can be accessible via a conventional application store, and can be downloadable and capable of storage and/or access (e.g., via distributed or cloud computing access) via one or more of the audio device 10, audio gateway 210, and smart device 280.

Figure 11:
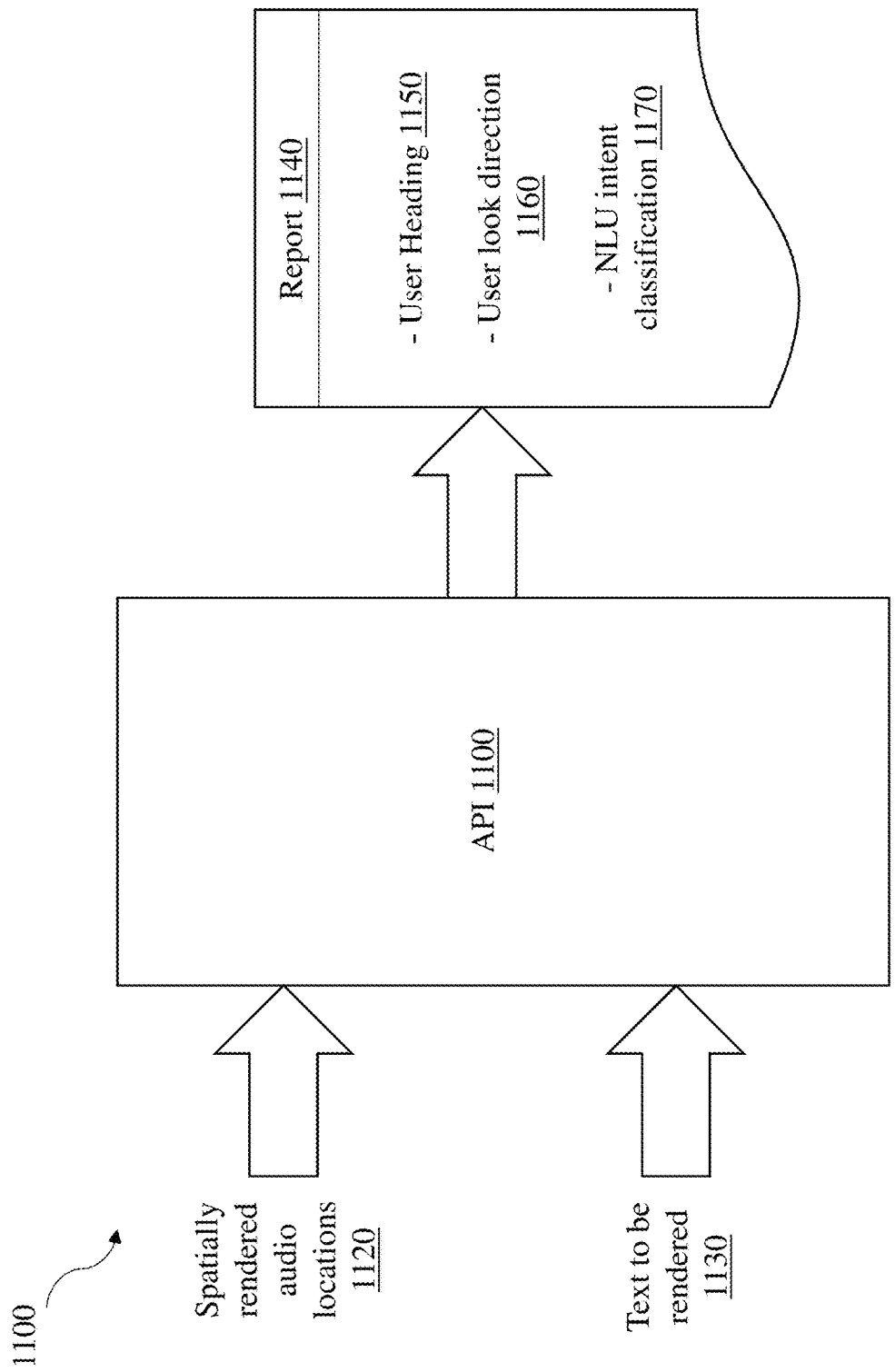
FIG. 11 is a schematic depiction of data flows relative to an application programming interface (API) according to various implementations.

In still further implementations, a method of generating a spatialized VPA in an audio device 10 is disclosed. This method can allow an application programmer to use the spatialized VPA audio engine 240 to program spatialized VPA audio responses for an audio device, e.g., a wearable audio device. In these cases, the method can include:

(A) providing an application programming interface (API) 1100, as shown in FIG. 11, with inputs 1110 including: i) a set of spatially rendered audio locations 1120 for providing a VPA audio response at the wearable audio device; and ii) text 1130 to be rendered as the VPA audio response at the set of spatially rendered audio locations 1120 by the wearable audio device. A programmer or other user can input this data into the API 1100 to generate a spatialized VPA in an audio device (e.g., audio device 10, FIG. 1).

The method can further include: (B) rendering the API inputs 1110 at the audio device 10 (FIG. 1) in response to a user activating a spatialized VPA audio mode. As described herein, the spatialized VPA audio mode can be activated by receiving one or more VPA commands from a user (e.g., user 320).

In additional implementations, the method can further include: (C) running the spatialized VPA audio mode on the audio device 10 in response to receiving the VPA command(s) from the user. In various implementations, this process includes providing one or more spatialized VPA audio responses, as described with reference to examples in FIGS. 3-10.

The method can also include: (D) receiving user interaction data from the spatialized VPA audio mode. In various implementations, this process includes receiving sensor data from the sensor system 36 (FIG. 2) about how the user 310 interacted with the audio device 10 and/or smart device 280 during playback of the spatialized VPA audio response(s), as well as how the user 310 reacted to those spatialized VPA audio responses (e.g., subsequent commands, including natural language parsing).

Additionally, the method can include: (E) providing a spatialized VPA report 1140 after running the spatialized VPA audio mode on the wearable audio device and receiving the user interaction data. In particular cases, the spatialized VPA report includes: a user heading 1150 for each user voice command received during the spatialized VPA audio mode, a user look direction 1160 associated with each user voice command, and a natural language understanding (NLU) intent classification 1170 for each user voice command and associated user look direction. The VPA report 1140 can be useful for a developer in building and/or refining the spatialized VPA functions of an audio device, for example, by providing information about how effectively the user's voice commands translated into intended VPA audio responses.

In contrast to conventional approaches, various aspects of the disclosure provide virtual personal assisting functions in a situationally aware, streamlined interface. The spatialized VPA audio engine 240 disclosed herein can utilize look direction and voice commands to significantly enhance VPA functions when compared with conventional approaches. In some cases, removing the need for a wake word (e.g., "Assistant") and relying upon look direction can make VPA interactions natural, and more efficient. Additionally, as the VPA functions described herein can augment various audio device functionalities, the spatialized VPA audio engine 240 can assist the user in many aspects of daily life. That is, according to various implementations, the VPA functions provide the user with a device interaction model that does not exist in conventional devices and/or platforms.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A wearable audio device comprising:
   a speaker comprising an acoustic transducer with a sound-radiating surface for providing an audio output;
   at least one microphone; and
   a control system coupled with the speaker and the at least one microphone, the control system configured to:
      receive a virtual personal assistant (VPA) command from a user; and
      output a VPA audio response to the VPA command in a spatially rendered audio location defined relative to a look direction of the user or relative to a physical location proximate the user, and according to at least one of a VPA setting, a location of the wearable audio device, the look direction of the user or a type of the VPA command.

2. The wearable audio device of claim 1, wherein at least one of the look direction of the user or the location of the wearable audio device is indicated by sensor data from a sensor system in communication with the control system, wherein the sensor system comprises at least one of: a global positioning system (GPS), an inertial measurement unit (IMU) or a camera.

3. The wearable audio device of claim 2, wherein the control system is further configured to:
   adjust the spatially rendered audio location of the VPA audio response in response to receiving updated sensor data indicating a change in the look direction of the user.

4. The wearable audio device of claim 2, wherein the VPA command from the user comprises a voice command detected by the at least one microphone, a tactile command detected by a tactile sensor in the sensor system or a gesture command detected by the inertial measurement unit (IMU) in the sensor system, and
   wherein the VPA audio response indicates areas of interest in the look direction of the user, and wherein the VPA audio response is configured to vary based on a detected change in the look direction of the user.

5. The wearable audio device of claim 1, wherein the control system is further configured to switch to a listen mode for the VPA command in response to sensor data indicating the user is positioned in a predetermined look direction.

6. The wearable audio device of claim 5, wherein the control system is further configured to receive the VPA command from the user while in the listen mode, and provide the VPA audio response, without a wake command from the user.

7. The wearable audio device of claim 1, wherein the control system is further configured to output the VPA audio response as a path of spatially rendered locations to direct the attention of the user along the direction of the path.

8. The wearable audio device of claim 1, wherein the VPA audio response comprises a menu of spatially delineated zones in an array defined relative to the look direction of the user, wherein the user can select between playback options in the array of spatially delineated zones using a voice command, a gesture command or a tactile command.

9. The wearable audio device of claim 1, wherein the VPA audio response is at least one audio source option in an array of spatially delineated zones, wherein at least one additional audio source option in the array of spatially delineated zones comprises a phone call source.

10. The wearable audio device of claim 1, wherein the VPA command comprises a series of voice commands at varying look direction positions, and wherein the control system is configured to update the spatially rendered audio location based upon natural language cues in the series of voice commands and corresponding look direction positions.

11. The wearable audio device of claim 1, wherein the VPA audio response comprises background audio shared between the user and an additional user on a phone call.

12. The wearable audio device of claim 1, wherein the VPA audio response comprises a plurality of audio sources corresponding with spatially delineated zones in an array, wherein the plurality of audio sources comprise distinct callers on a conference call, and wherein the distinct callers are each arranged in one of the spatially delineated zones in the array.

13. The wearable audio device of claim 1, wherein the VPA audio response further comprises audio playback at two distinct spatially rendered audio locations.

14. The wearable audio device of claim 13, wherein the audio playback at the two distinct spatially rendered audio locations comprise two distinct audio feeds, wherein a first one of the distinct spatially rendered audio locations is associated with a first one of the distinct audio feeds and is forward-oriented relative to the look direction of the user, and wherein a second one of the distinct spatially rendered audio locations is associated with a second one of the distinct audio feeds and is not forward-oriented relative to the look direction of the user.

15. A computer-implemented method of controlling a wearable audio device, the method comprising:
  receiving a virtual personal assistant (VPA) command from a user;
  receiving sensor data indicating a look direction of the user; and
  outputting a VPA audio response to the VPA command in a spatially rendered audio location defined relative to the look direction of the user or relative to a physical location proximate the user, and according to at least one of a VPA setting, a location of the wearable audio device, the look direction of the user or a type of the VPA command.

16. The method of claim 15, further comprising:
  adjusting the spatially rendered audio location of the VPA audio response in response to receiving updated sensor data indicating a change in the look direction of the user.

17. The method of claim 15, wherein the VPA command from the user comprises a voice command detected by at least one microphone at the wearable audio device, a tactile command detected by a tactile sensor at the wearable audio device or a gesture command detected by an inertial measurement unit (IMU) in the wearable audio device, and wherein the VPA audio response indicates areas of interest in the look direction of the user, and wherein the VPA audio response is configured to vary based on a detected change in the look direction of the user.

18. The method of claim 15, further comprising:
  switching the wearable audio device to a listen mode for the VPA command in response to the sensor data indicating user is positioned in a predetermined look direction.

19. The method of claim 18, further comprising:
  receiving the VPA command from the user while the wearable audio device is in the listen mode, and providing the VPA audio response, without a wake command from the user.

20. The method of claim 15, wherein the VPA audio response is output as a path of spatially rendered locations to direct the attention of the user along the direction of the path.

21. The method of claim 15, wherein the VPA audio response comprises a menu of spatially delineated zones in an array defined relative to the look direction of the user, wherein the user can select between playback options in the array of spatially delineated zones using a voice command, a gesture command or a tactile command.

22. The method of claim 15, wherein the VPA audio response is at least one audio source option in an array of spatially delineated zones, wherein at least one additional audio source option in the array of spatially delineated zones comprises a phone call source.

23. The method of claim 15, wherein the VPA command comprises a series of voice commands at varying look direction positions, and wherein the method further comprises updating the spatially rendered audio location based upon natural language cues in the series of voice commands and corresponding look direction positions.

24. The method of claim 15, wherein the VPA audio response comprises background audio shared between the user and an additional user on a phone call.

25. The method of claim 15, wherein the VPA audio response comprises a plurality of audio sources corresponding with spatially delineated zones in an array, wherein the plurality of audio sources comprise distinct callers on a conference call, and wherein the distinct callers are each arranged in one of the spatially delineated zones in the array.

26. The method of claim 15, wherein the VPA audio response further comprises audio playback at two distinct spatially rendered audio locations.

27. The method of claim 26, wherein the audio playback at the two distinct spatially rendered audio locations comprise two distinct audio feeds, wherein a first one of the distinct spatially rendered audio locations is associated with a first one of the distinct audio feeds and is forward-oriented relative to the look direction of the user, and wherein a second one of the distinct spatially rendered audio locations is associated with a second one of the distinct audio feeds and is not forward-oriented relative to the look direction of the user.

28. A computer-implemented method of generating a spatialized virtual personal assistant (VPA) in a wearable audio device, the method comprising:
  providing an application programming interface (API) with inputs comprising:
    a set of spatially rendered audio locations for providing a VPA audio response at the wearable audio device; and
    text to be rendered as the VPA audio response at the set of spatially rendered audio locations by the wearable audio device; and
  rendering the API inputs at the wearable audio device in response to a user activating a spatialized VPA audio mode.

29. The computer-implemented method of claim 28, further comprising:
  running the spatialized VPA audio mode on the wearable audio device;
  receiving user interaction data from the spatialized VPA audio mode; and
  providing a spatialized VPA report after running the spatialized VPA audio mode on the wearable audio device and receiving the user interaction data, the spatialized VPA report comprising:
    a user heading for each user voice command received during the spatialized VPA audio mode;
    a user look direction associated with each user voice command; and
    a natural language understanding (NLU) intent classification for each user voice command and associated user look direction.

* * * * *